United States Patent
Aldrey et al.

(10) Patent No.: US 12,518,086 B1
(45) Date of Patent: Jan. 6, 2026

(54) METHODS AND SYSTEMS FOR INTERACTIVE DATA INPUT

(71) Applicant: CITIBANK, N.A., New York, NY (US)

(72) Inventors: Raul Aldrey, Irving, TX (US); Ahmar Mubeen, Irving, TX (US); Vinh Chu, Irving, TX (US); Rohit Yerneni, Irving, TX (US); Klesta Lamaj, New York, NY (US); Adhi N. Narashimmamoorthy, Irving, TX (US); Dale Bauer, Naperville, IL (US); Matthew Bills, Chicago, IL (US); Dante Diaz, Frisco, TX (US); Kristi M. Emery, Coppell, TX (US); David Hyser, Wilmette, IL (US); Michael Brandt, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 19/015,269

(22) Filed: Jan. 9, 2025

Related U.S. Application Data

(63) Continuation-in-part of application No. 18/818,461, filed on Aug. 28, 2024, which is a continuation of
(Continued)

(51) Int. Cl.
    *G06F 40/174* (2020.01)
    *G06F 3/0481* (2022.01)
    (Continued)

(52) U.S. Cl.
    CPC .......... *G06F 40/174* (2020.01); *G06F 3/0481* (2013.01); *G06F 3/04812* (2013.01);
    (Continued)

(58) Field of Classification Search
    CPC ..... H04L 63/08; H04L 63/10; H04L 63/0807; H04L 63/0815; H04L 63/0823;
    (Continued)

(56) References Cited

U.S. PATENT DOCUMENTS

| | | | |
|---|---|---|---|
| 6,393,423 B1 | 5/2002 | Goedken | |
| 8,762,195 B1 * | 6/2014 | Martin | G06Q 30/00 705/7.35 |

(Continued)

OTHER PUBLICATIONS

Space10, "Turn your sales into conversations", Space10, archived on Mar. 25, 2020 at URL: https://web.archive.org/https://space10-community.github.io/conversational-form/landingpage/ (6 pages).
(Continued)

*Primary Examiner* — Daniel Rodriguez
(74) *Attorney, Agent, or Firm* — Foley & Lardner LLP

(57) ABSTRACT

Described herein are methods and systems to provide varying levels of access to a user according to a requested activity. A server receives, from a computing device operated by a user, a request to perform an activity; retrieves from the computing device, a unique identifier of the computing device and at least one operational attribute of the computing device. The server accesses a database to identify a temporary profile that matches the data retrieved from the computing device and the at least one operational attribute of the computing device to identify a communication identifier from the temporary profile. The server transmits a notification using the communication identifier to determine an authorization level of the user based on a response to the notification and the at least one operational attribute. When the requested activity is included within the authorization level, the server authorizes the computing device to perform the activity.

20 Claims, 31 Drawing Sheets

Related U.S. Application Data application No. 18/372,403, filed on Sep. 25, 2023, now Pat. No. 12,079,567, which is a continuation of application No. 17/560,065, filed on Dec. 22, 2021, now Pat. No. 11,893,340, which is a continuation of application No. 16/932,051, filed on Jul. 17, 2020, now Pat. No. 11,270,063.

(51) Int. Cl.
*G06F 3/04812* (2022.01)
*G06F 3/04895* (2022.01)
*G06F 9/451* (2018.01)
*G06F 16/958* (2019.01)
*H04L 9/40* (2022.01)
*H04L 51/046* (2022.01)

(52) U.S. Cl.
CPC .......... *G06F 3/04895* (2013.01); *G06F 9/453* (2018.02); *G06F 16/958* (2019.01); *H04L 51/046* (2013.01); *H04L 63/08* (2013.01)

(58) Field of Classification Search
CPC .............. H04L 63/083; H04L 63/0853; H04L 63/0861; H04L 63/0869; H04L 63/0876; H04L 63/0884; H04L 63/0892; H04L 63/0846; H04L 63/0838; G06F 3/048–05
See application file for complete search history.

(56) References Cited

U.S. PATENT DOCUMENTS

| | | | |
|---|---|---|---|
| 8,966,036 B1* | 2/2015 | Asgekar | H04W 4/08 707/706 |
| 10,440,015 B1 | 10/2019 | Pham et al. | |
| 10,748,157 B1* | 8/2020 | Indyk | G06Q 30/016 |
| 10,795,640 B1 | 10/2020 | Knight et al. | |
| 10,853,563 B1 | 12/2020 | Chen et al. | |
| 11,171,989 B1 | 11/2021 | Kim | |
| 11,410,230 B1 | 8/2022 | Olson et al. | |
| 2003/0110443 A1 | 6/2003 | Yankovich et al. | |
| 2004/0019564 A1* | 1/2004 | Goldthwaite | G06Q 20/425 705/44 |
| 2007/0156898 A1* | 7/2007 | Appleby | H04L 63/10 709/225 |
| 2008/0098291 A1 | 4/2008 | Bradley et al. | |
| 2010/0100945 A1* | 4/2010 | Ozzie | H04L 63/18 726/5 |
| 2011/0213642 A1 | 9/2011 | Makar et al. | |
| 2012/0095835 A1 | 4/2012 | Makar et al. | |
| 2012/0288845 A1 | 11/2012 | Kumar Gl | |
| 2013/0086186 A1 | 4/2013 | Tomkow | |
| 2015/0149878 A1 | 5/2015 | Ling et al. | |
| 2015/0339668 A1* | 11/2015 | Wilson | G06Q 20/40 705/41 |
| 2016/0155196 A1 | 6/2016 | Haller et al. | |
| 2017/0192950 A1 | 7/2017 | Gaither et al. | |
| 2017/0230312 A1 | 8/2017 | Barrett et al. | |
| 2017/0250930 A1 | 8/2017 | Ben-Itzhak | |
| 2018/0075014 A1 | 3/2018 | Duan | |
| 2018/0143973 A1 | 5/2018 | Hambrick et al. | |
| 2018/0234367 A1 | 8/2018 | Lange et al. | |
| 2018/0331979 A1 | 11/2018 | Rakovitsky et al. | |
| 2019/0087707 A1 | 3/2019 | Cummins et al. | |
| 2019/0095702 A1 | 3/2019 | Chan et al. | |
| 2019/0122214 A1 | 4/2019 | Chau et al. | |
| 2019/0138600 A1 | 5/2019 | Krishnan et al. | |
| 2019/0220727 A1 | 7/2019 | Dohrmann et al. | |
| 2019/0362086 A1 | 11/2019 | Vanloo et al. | |
| 2020/0044998 A1 | 2/2020 | Jeon et al. | |
| 2020/0118126 A1* | 4/2020 | Metral | G06Q 20/20 |
| 2020/0134532 A1 | 4/2020 | Yamane et al. | |
| 2020/0218766 A1 | 7/2020 | Yaseen et al. | |
| 2020/0341604 A1 | 10/2020 | Hewitt | |
| 2020/0342032 A1 | 10/2020 | Subramaniam et al. | |
| 2020/0380202 A1 | 12/2020 | Cass et al. | |
| 2021/0089618 A1 | 3/2021 | Jain et al. | |
| 2021/0157618 A1 | 5/2021 | Moon | |
| 2021/0248674 A1 | 8/2021 | Ogunbunmi | |
| 2021/0279232 A1 | 9/2021 | Kim | |
| 2021/0319450 A1* | 10/2021 | Newland | G06Q 20/385 |
| 2022/0301050 A1 | 9/2022 | Slowiak et al. | |
| 2023/0245220 A1 | 8/2023 | Crogan et al. | |
| 2024/0202285 A1 | 6/2024 | Dechu et al. | |

OTHER PUBLICATIONS

Tang, Shekman, "The cult of conversational design: why forms aren't dead yet", Inside Intercom, Oct. 11, 2017, retrieved from URL: https://www.intercom.com/blog/why-forms-arent-dead-yet/ (12 pages).

* cited by examiner

1600

- 1602 — Receive, via a graphical user interface displayed on a computing device, a first request to execute a network operation.

- 1604 — Responsive to the execution of the network operation, transmit, to a second server, a request for access to an electronic account associated with an electronic application of a user operating the computing device.

- 1606 — Responsive to the second server authenticating the request, receive, from the second server, an indication that a request to access and change at least one data record associated with the electronic account has been blocked by the second server.

- 1608 — Revise the graphical user interface by presenting an input element configured to receive a second request to remove the blocked access.

- 1610 — Authorize the user operating the computing device via transmitting a token to the computing device.

- 1612 — Generate a defined time to remove the blocked access on the electronic account, responsive to the reception of the token at the computing device.

- 1614 — Caue the second server to remove the blocked access on the electronic account and provide access to the electronic account for the defined time.

- 1616 — Cause the second server to block future access to the electronic account when a third request is received from the electronic device after the defined time.

FIG.16

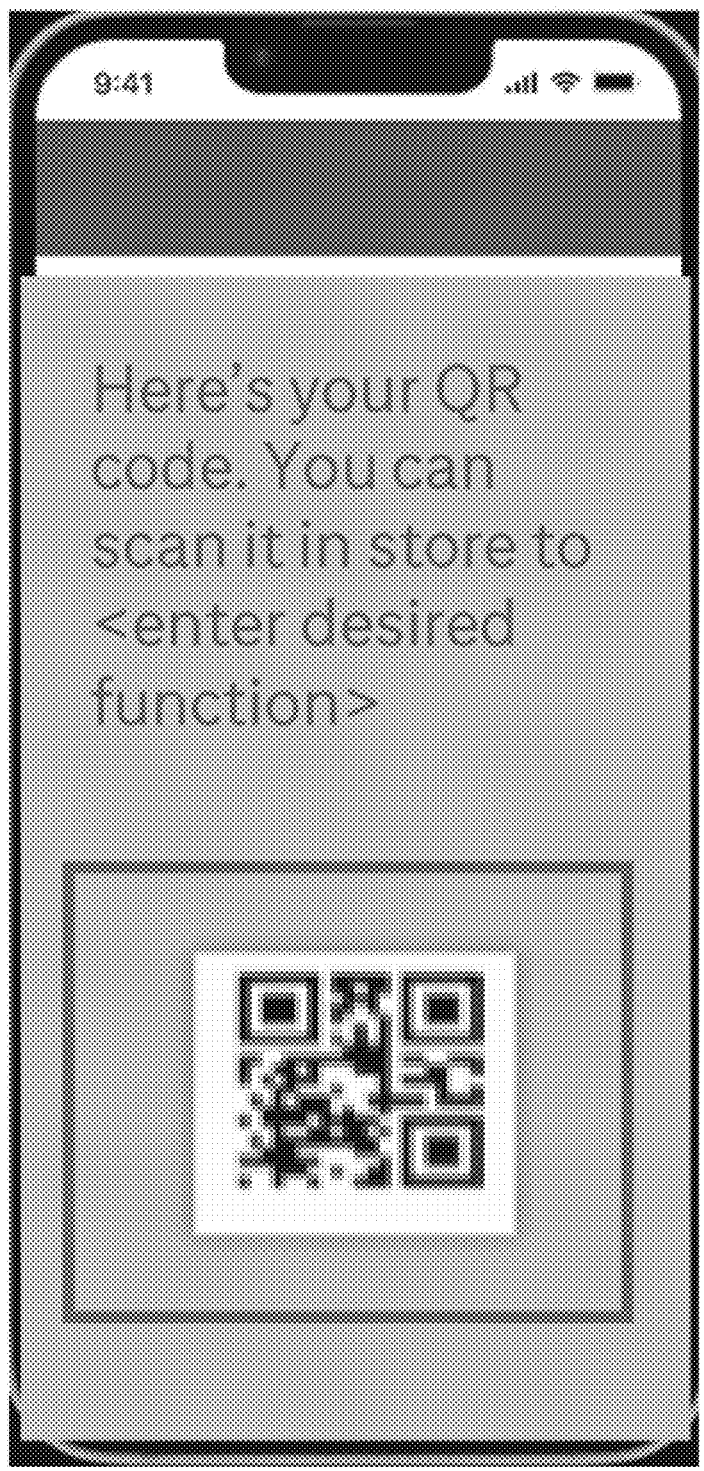
FIG. 30

METHODS AND SYSTEMS FOR INTERACTIVE DATA INPUT

CROSS-REFERENCE TO RELATED APPLICATIONS

This application is a continuation-in-part application of U.S. patent application Ser. No. 18/818,461, filed on Aug. 28, 2024, which is a continuation of U.S. patent application Ser. No. 18/372,403, filed on Sep. 25, 2023, now U.S. Pat. No. 12,079,567, which is a continuation of U.S. patent application Ser. No. 17/560,065, filed on Dec. 22, 2021, now U.S. Pat. No. 11,893,340, which is a continuation of U.S. patent application Ser. No. 16/932,051, filed on Jul. 17, 2020, now U.S. Pat. No. 11,270,063, all of which are incorporated herein by reference in their entireties for all purposes.

TECHNICAL FIELD

This application relates generally to interactive/dynamic graphical user interfaces for inputting data.

BACKGROUND

Current methods of data ingestion do not provide a positive user experience. Conventional software solutions provide various methods for data intake/ingestion. When requesting users to input data, current methods typically provide a list of questions and input fields where the user is requested to "fill in" the data. As depicted in FIG. 1, a server displays various input fields associated with a conventional intake form on a graphical user interface (GUI). Users must interact with the input fields to complete the data intake form. Interacting with static input fields creates a negative user experience for two reasons. First, static input fields provide a tedious and time-consuming data intake method. Second, inputting data using static input fields is an error-prone process where users may enter the information into the wrong input field.

Further, conventional methods of data access, extraction, and retention do not provide a positive user experience. For example, conventional software solutions cannot allow a user to abandon an application or an electronic form in which sensitive information has been stored. In the event that the user does abandon the application, the sensitive information can be lost thereby negatively impacting the user (e.g., hard credit inquiry). In another example, conventional software solutions struggle to authenticate a user without the use of a username or password.

SUMMARY

For the aforementioned reasons, there is a desire for an electronic platform that allows for efficient and timely inputting of data, efficient extraction of the data, and a novel means to access an account associated with the data. Described herein are methods and systems to provide an electronic platform that displays dynamic input fields, which emulate a real-life electronic conversation with the user, such as through text messaging. The methods and systems described herein provide chat-like messages to the user allowing the user to interact with the messages and input data where appropriate. The methods and systems described herein reduce data entry time by emulating a conversation with a data intake form. Embodiments herein may allow retrieval of sensitive information, even after a user has abandoned an electronic application. Further, embodiments may allow authentication of a user without requiring a username and password. The methods and systems can also provide varying level of access to an account without the need to create multiple accounts to access the account.

In an embodiment, a method comprises retrieving, by a server, a set of prompts associated with an electronic form; displaying, by the server for presentation on a webpage, a first graphical element comprising a first conversation bubble shape and containing a text string corresponding to a first prompt of the set of prompts; displaying, by the server, a second graphical element below the first graphical element and comprising a second conversation bubble shape that contains an input element configured to receive an input from a user interacting with the webpage and a button for causing transmission of the input to the server, upon the button being activated to transmit the input in the input element to the server, dynamically revising, by a server, the second graphical element by displaying the input received from the user in the place of the corresponding input element; displaying, by the server, a third graphical element comprising a third conversation bubble shape and containing a second text string corresponding to a second prompt of the set of prompts, wherein the third graphical element is displayed below the second graphical element; and aggregating, by the server, each input from each input element for compiling the electronic form.

In another embodiment, a system comprises a server comprising a processor and a non-transitory computer-readable medium containing instructions that when executed by the processor causes the processor to perform operations comprising: retrieve a set of prompts associated with an electronic form; display, for presentation on a webpage, a first graphical element comprising a first conversation bubble shape and containing a text string corresponding to a first prompt of the set of prompts; display a second graphical element below the first graphical element and comprising a second conversation bubble shape that contains an input element configured to receive an input from a user interacting with the webpage and a button for causing transmission of the input to the server; upon the button being activated to transmit the input in the input element to the server, dynamically revise the second graphical element by displaying the input received from the user in the place of the corresponding input element; display a third graphical element comprising a third conversation bubble shape and containing a second text string corresponding to a second prompt of the set of prompts, wherein the third graphical element is displayed below the second graphical element; and aggregate each input from each input element for compiling the electronic form.

In an embodiment, a method comprises receiving, by a server from a second server, a first indication of a user operating a computing device is interacting with an electronic application on a page hosted by the second server, the first indication corresponding to a request received via the computing device for the second server to populate the page with a plurality of prompts on behalf of the second server; instructing, by the server, the second server to display a plurality of prompts on the page corresponding to the first indication; retrieving, by the server from the computing device, a plurality of responses to the plurality of prompts, each response in the plurality of responses corresponding to each prompt in the plurality of prompts; generating, by the server, a profile for the user based on the plurality of responses; in response to receiving an indication of abandonment representing a lack of interaction with the electronic application, accessing, by the server, a database to identify a temporary profile that matches the generated profile for the user; extracting, by the server, a communication identifier from the temporary profile; transmitting, by the server, a notification using the communication identifier, the notification including one or more authentication criteria; and in response to receiving a response to the notification satisfying the one or more authentication criteria, loading, by the server for display on the computing device, a second page having at least one prompt of the electronic application prefilled using data extracted from the generated profile.

In another embodiment, a system comprises a server comprising one or more processors to receive, from a second server, a first indication of a user operating a computing device interacting with an electronic application on a page hosted by a second server, the first indication corresponding to a request received via the computing device for the second server to populate the page with a plurality of prompts on behalf of the second server; instruct the second server to display the plurality of prompts on the page corresponding to the first indication; retrieve, from the computing device, a plurality of responses to the plurality of prompts, each response in the plurality of responses corresponding to each prompt in the plurality of prompts; generate a profile for the user based on the plurality of responses; in response to receiving, from the second server, an indication of abandonment representing a lack of interaction with the electronic application, access a database to identify a profile that matches the generated temporary profile for the user; extract a communication identifier from the temporary profile; transmit a notification using the communication identifier, the notification including one or more authentication criteria; and in response to receiving a response to the notification satisfying the one or more authentication criteria, load, for display on the computing device, a second page having at least one prompt of the electronic application prefilled using data extracted from the generated profile.

In an embodiment, a method comprises receiving, by a server via a graphical user interface displayed on a computing device, a first request to execute a network operation; transmitting, by the server to a second server, a request for access to an electronic account associated with an electronic application of a user operating the computing device; responsive to the second server authenticating the request, receiving, by the server from the second server, an indication that a request to access and change at least one data record associated with the electronic account has been blocked by the second server; revising, by the server, the graphical user interface by presenting an input element configured to receive a second request to remove the blocked access; authorizing, by the server, the user operating the computing device via transmitting a token to the computing device; generating, by the server, a defined time to remove the blocked access on the electronic account, responsive to reception of the token at the computing device; causing, by the server, the second server to remove the blocked access on the electronic account and provide access to the electronic account for the defined time; and causing, by the server, the second server to block future access to the electronic account, responsive to receiving a third request from the computing device after the defined time.

In an embodiment, a system comprises a server and one or more processors to receive, via a graphical user interface displayed on a computing device, a first request to execute a network operation; responsive to the execution of the network operation, transmit, to a second server, a request for access to an electronic account associated with an electronic application of a user operating the computing device; responsive to the second server authenticating the request, receive, from the second server, an indication that a request to access and change at least one data record associated with the electronic account has been blocked by the second server; revise the graphical user interface by presenting an input element configured to receive a second request to remove the blocked access; authorize the user operating the computing device via transmitting a token to the computing device; generate a defined time to remove the blocked access on the electronic account, responsive to reception of the token at the computing device; cause, the second server to remove the blocked request on the electronic account and provide access to the electronic account for the defined time; cause the second server to block future access to the electronic account, responsive to receiving a third request from the computing device after the defined time.

In an embodiment, a method comprises receiving, by a server from a computing device operated by a user, a request to perform an activity; retrieving, by the server from the computing device, a unique identifier of the computing device and at least one operational attribute of the computing device; accessing, by the server, a database to identify temporary profile that matches the data retrieved from the computing device the at least one operational attribute of the computing device; using the temporary profile and the data, identifying, by the server, a communication identifier; transmitting, by the server, a notification using the communication identifier, the notification including one or more authentication criteria; determining, by the server, an authorization level of the user based on a response to the notification and the at least one operational attribute; and in response to the requested activity being included within the authorization level, authorizing, by the server, the computing device to perform the activity.

In another embodiment, a system comprises a server comprising one or more processors to receive, from a computing device operated by a user, a request to perform an activity; retrieve from the computing device, a unique identifier of the computing device and at least one operational attribute of the computing device; access a database to identify temporary profile that matches the data retrieved from the computing device the at least one operational attribute of the computing device; using the temporary profile and the data, identify a communication identifier; transmit a notification using the communication identifier, the notification including one or more authentication criteria; determine an authorization level of the user based on a response to the notification and the at least one operational attribute; and in response to the requested activity being included within the authorization level, authorize the computing device to perform the activity.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

FIG. 16 illustrates a flowchart depicting operational steps to partially freeze an electronic account, in accordance with different embodiments.

FIGS. 23-30 illustrate various graphical user interfaces displayed by the analytics server, in accordance with different embodiments.

DETAILED DESCRIPTION

Figure 1:
FIG. 1 illustrates an example of a conventional data intake form, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 2A:
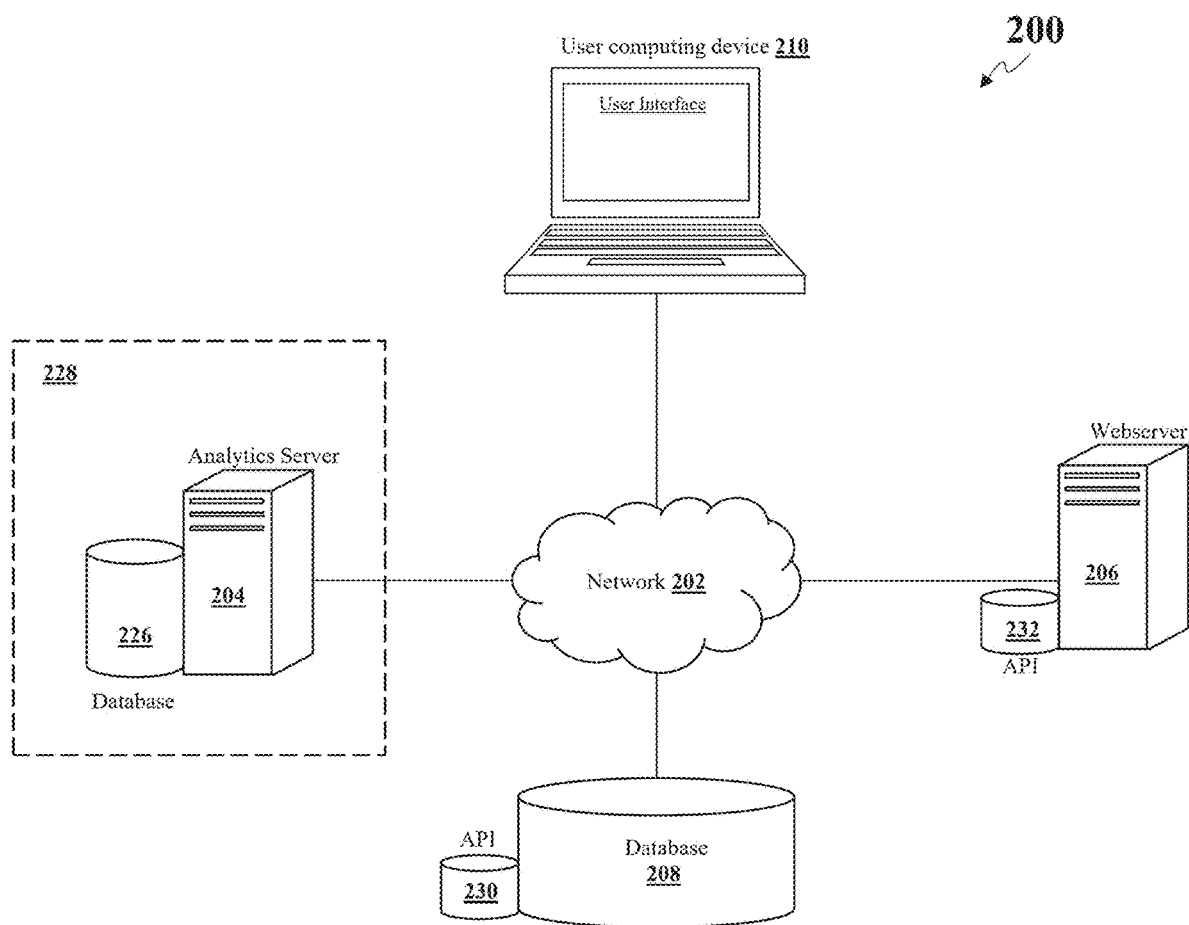
FIG. 2A illustrates an example of a computer system for generating a chat-like data input methods, systems, and graphical user interfaces, in accordance with an embodiment.

FIG. 2A illustrates various components of a system 200 for generating a chat-like data input platform, in accordance with an embodiment. The system 200 provides a non-limiting example of a computer system having various features that can be utilized to provide graphical user interfaces displaying an intelligent data intake form. The system 200 may be utilized by third party webserver (e.g., webserver 206) to incorporate graphical user interfaces generated by the analytics server 204. In some configurations, the graphical user interfaces generated by the analytics server 204 may be incorporated into one or more webpages hosted by the webserver 206. In other configurations, the graphical user interfaces generated by the analytics server 204 may be directly displayed onto the end users computing device (e.g., user-computing device 210).

The system 200 may include an analytics server 204, webserver 206, database 208, and user-computing device 210. These features may communicate with each other over a network 202. The network 202 may include, but is not limited to, private or public local area network, wireless local area network, metropolitan area network, wide-area network, and the Internet. The network 202 may further include both wired and wireless communications according to one or more standards via one or more transport mediums. The communication over the network 202 is in accordance with various communication protocols such as transmission control protocol and internet protocol, user datagram protocol, and institute of electrical and electronics engineers (IEEE) communication protocols. The network 202 may further include wireless communications according to Bluetooth specification sets, or another standard or proprietary wireless communication protocol. The network 202 may further include communications over a cellular network, including, for example, a global system for mobile communications, code division multiple access, and enhanced data for global evolution network.

The system 200 may operate in a local computing environment where the user-computing device 210 may execute an application to access an electronic platform generated/hosted by the webserver 206. An example of an electronic platform may be a website accessible through a browser application. For instance, the user-computing device 210 may execute a browser application and access a website hosted by the webserver 206. Even though some embodiments described herein focus on a website hosted by the webserver, the methods and systems described herein are not limited to websites. For instance, the webserver may also host/generate an internal application accessible by the user-computing device 210 (e.g., internal application native to an organization where an employee operating the user-computing device 210 may access). The methods and systems described herein apply to generating various intelligent data intake graphical user interfaces. These graphical user interfaces may be embedded into other graphical user interfaces and/or applications, such as embedded within a website or any other application.

The system 200 may operate in a cloud-computing environment where the user-computing device 210 may be cloud-optimized. The user computing device 210 data may execute the browser application and access graphical user interfaces generated by the analytics server 204. The graphical user interfaces generated by the analytics server 204 (e.g., services provided by the analytics server 204) may be stored and executed on a remote cloud-based analytics server 204 accessed over a network cloud. In the cloud-computing environment, a web browser on the user-computing device 210 may interface with an application program associated with the analytics server 204, which is executed remotely via cloud-based technology.

The analytics server 204 may be any computing device capable of performing the actions described herein. For instance, the analytics server 204 may include a processing unit, and a non-transitory machine-readable storage medium. The processing unit may include a processor with a computer-readable medium, such as a random access memory coupled to the processor. The analytics server 204 may be executing algorithms or computer executable program instructions, which may be executed by a single processor or multiple processors in a distributed configuration. The analytics server 204 may be configured to interact with one or more software modules of a same or a different type operating within the system 200.

Non-limiting examples of the processor may include a microprocessor, an application specific integrated circuit, and a field programmable object array, among others. The analytics server 204 is capable of executing data processing tasks, data analysis tasks, and valuation tasks. Non-limiting examples of the analytics server 204 may include a desktop computer, a server computer, a laptop computer, a tablet computer, and the like. For case of explanation, the FIG. 2A depicts a single server computing device functioning as the analytics server 204. However, some embodiments may include a plurality of server computing devices capable of performing various tasks described herein.

The analytics server 204 may utilize a database, such as the database 226, to store and/or retrieve various data described herein. For instance, the analytics server 204 may store different sets of prompts corresponding to different electronic forms/applications within the database 226. Each set of prompts may include an identifier associated with its corresponding electronic form. For instance, the analytics server 204 may populate a dataset corresponding to a set of prompts along with an order of display for each prompt. The dataset may also identify a corresponding electronic form (e.g., online application for credit card X). When the analytics server 228 receives a request from the user-computing device 210 and/or the webserver 206 to display prompts associated with the online application for credit card X, the analytics server 204 queries the database 226 and retrieves the corresponding dataset. The analytics server may then use the methods/systems described herein to dynamically display the set of prompts in accordance with the order of display retrieved from the dataset.

Figure 4:
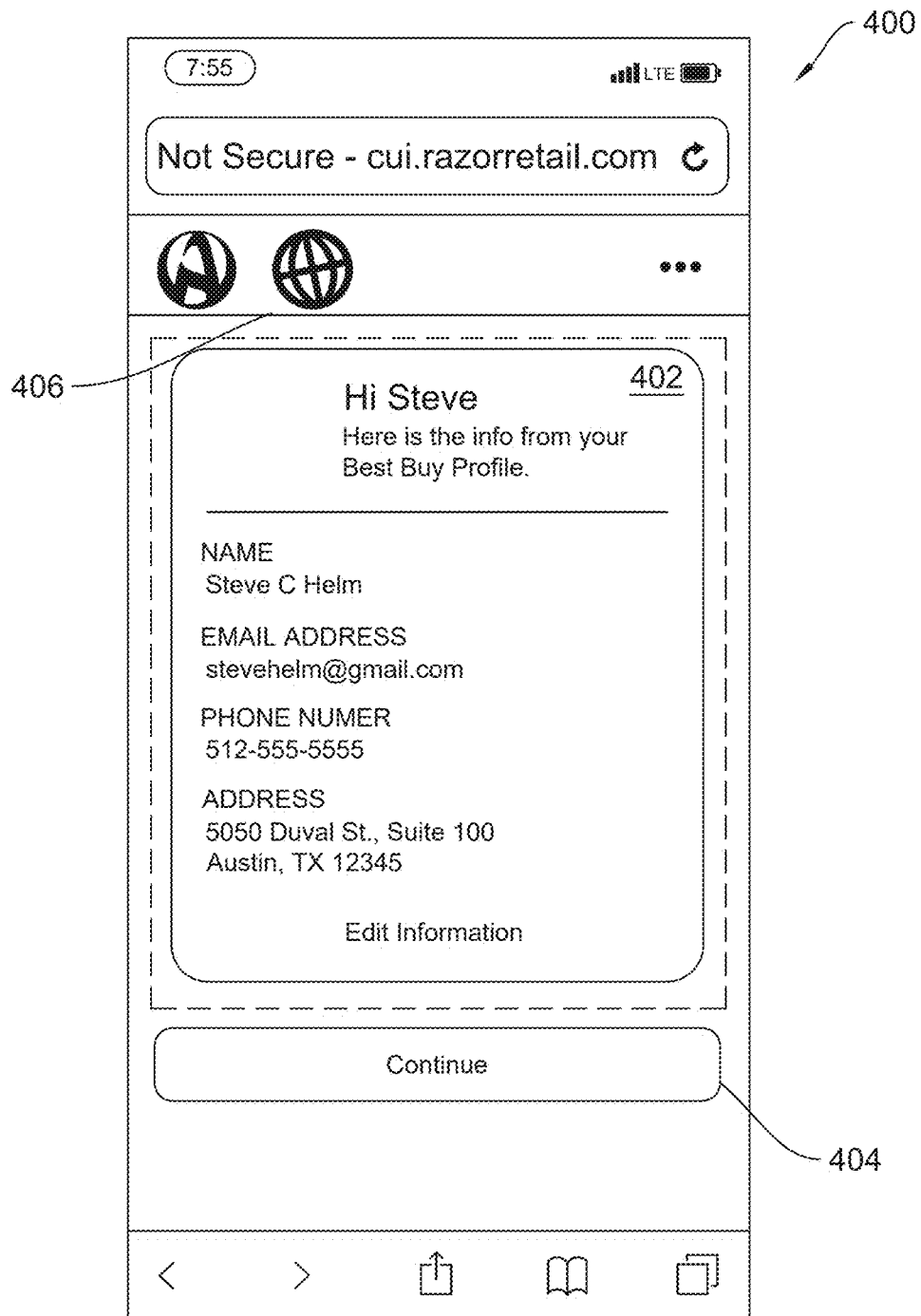
Figure 5:
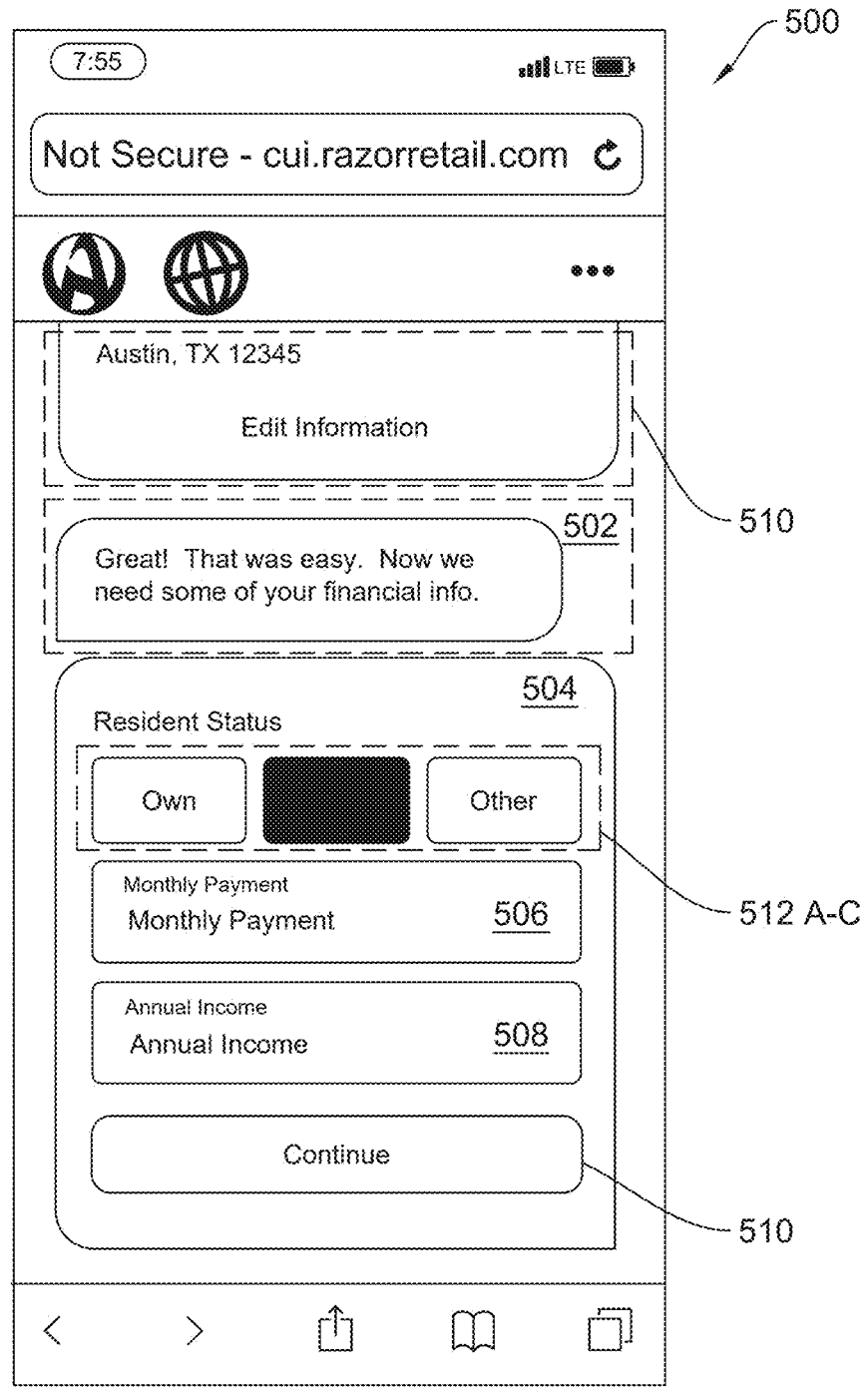
Figure 6:
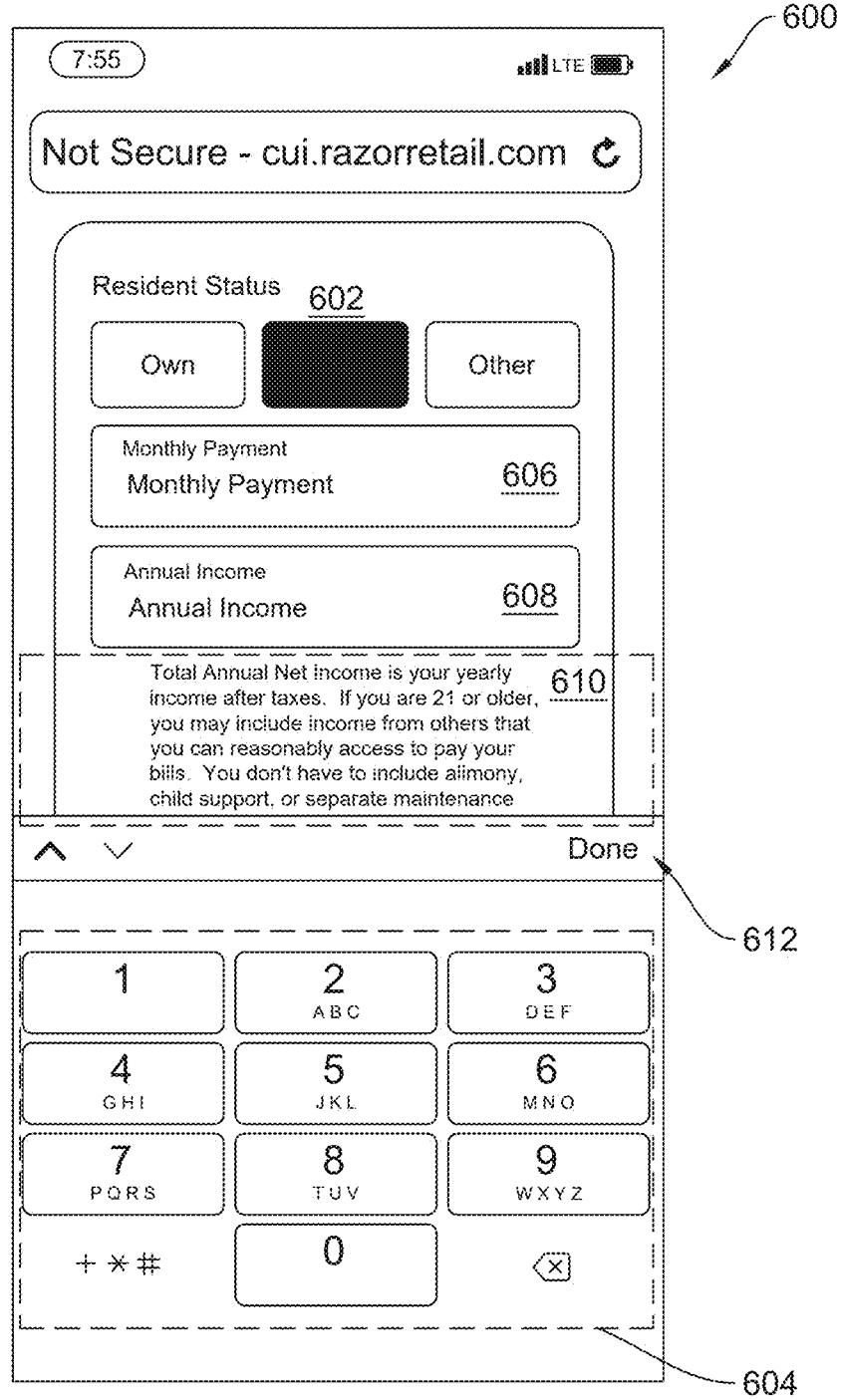

The database 226 may also include data associated with the user operating the user-computing device 210. The analytics server 204 may also retrieve data (e.g., demographic and/or financial) data associated with the user requesting the electronic form. For instance, the database 226 may include user data (e.g., previously populated by the analytics server 204 and/or periodically retrieved from a third-party data source). When the user requests an electronic form, the analytics server 204 may query and retrieve user data from the database 226 and/or database 208. The analytics server may prefill parts of the electronic form, thereby minimizing the inputs required by the user. A non-limiting example of the analytics server 204 prefilling user data is depicted in FIG. 4.

The analytics server 204 and the database 226 may represent a secondary organization's server and database. The secondary organization 228 may be an organization offering dynamic display of electronic forms for the webserver 206. An example of the secondary organization 228 may include a financial institution, such as a bank. In a non-limiting example, the webserver 206 may generate/host a website for a merchant offering credit card services issued/ facilitated by a bank (represented here as the secondary organization 228 that includes the analytics server 204). The analytics server 204 may then display the credit card form using methods/systems described herein and may process the user's credit card application.

The analytics server 204 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of the system 200. Using different APIs, the analytics server 204 may automatically transmit and/or receive calls and instruction. For instance, the analytics server 204 may use API 232 to communicate with the webserver 206, such that when a user operating the user computing device 210 requests a particular electronic form, the API 232 automatically transmits an instruction to the analytics server 204. The instruction may include data needed for the analytics server 204 to generate and display the chat-like GUIs described herein.

The analytics server 204 may also use the API 230 to communicate with the database 208 (e.g., retrieve the set of prompts).

The API 230 and/or 232 may be two-way APIs. A two way API refers to an API that allows information to be transmitted back and forth between at least two features of the system 200. For instance, when a user operating the user computing device 210 requests an electronic form via a website hosted by the webserver 206, the API 232 may generate a call instructing the analytics server 204 to display the chat-like GUIs described herein. The call may include data associated with the electronic form and/or the user requesting the electronic form. The analytics server 204 may then use the methods and systems described herein to generate various GUIs configured to emulate a conversation with the user.

The analytics server 204 may also use the API 232 to transmit a second call to the webserver 206. The second call may include instructions to display the generated GUIs (e.g., software code defining the GUIs and instructing the webserver 206 to embed the GUIs within one or more webpages). As the webserver 206 displays the GUIs, the analytics server 204 may use the API 232 to receive user inputs (e.g., responses received from the user operating the user-computing device 210). The analytics server 204 may then aggregate the responses and use the API 232 to transmit the aggregated responses to the webserver 206. The analytics server may similarly use a two-way API to communicate with the database 208.

Additionally or alternatively, the analytics server may use a content delivery network (CDN) to ensure data integrity when communicating with different features described in the system 200. A CDN, as described herein, refers to a distributed delivery network of proxy servers/nodes that uses multi-layered delivery methods/systems to transmit data (e.g., Akamai). The analytics server 204 may use a CDN when communicating various calls/instructions with the webserver 206 (directly or via the API 232) and/or the database 208 (directly or via the API 230).

The webserver 206 may be a computing device hosting a website (or any other electronic platform) accessible to the user-computing device 210 via the network 202. The webserver 206 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the webserver 206 may include workstation computers, laptop computers, server computers, laptop computers, and the like. While the system 200 includes a single webserver 206, in some embodiments the webserver 206 may include a number of computing devices operating in a distributed computing environment.

The webserver 206 may be executing algorithms or computer executable program instructions, which may be executed by a single processor or multiple processors in a distributed configuration. The webserver 206 may be configured to interact with one or more software modules of a same or a different type operating within the system 200. For instance, the webserver 206 may execute software applications configured to host an electronic platform, which may generate and serve various webpages to the user-computing device 210. The electronic platform may also embed various graphical user interfaces generated by the analytics server 204.

The webserver 206 may execute software applications configured to display the user interfaces described herein (e.g., host a website that displays graphical user interfaces generated by the analytics server 204), which may generate and serve various webpages to user computing device 210. The analytics server 204 and/or the webserver 206 may be configured to require user authentication based upon a set of user authorization credentials (e.g., username, password, biometrics, cryptographic certificate, and the like). In such implementations, the analytics server 204 and/or the webserver 206 may access a system database (e.g., database 208) configured to store user credentials, which the analytics server 204 and/or the webserver 206 may be configured to reference in order to determine whether a set of entered credentials (purportedly authenticating the user) match an appropriate set of credentials that identify and authenticate the user.

The analytics server 204 and/or the webserver 206 may generate and host webpages onto the user-computing device 210 based upon a user's role within the system 200. In such implementations, the user's role may be defined by data fields and input fields in user records stored in the database 208. The analytics server 204 and/or the webserver 206 may authentication the user and may identify the user's role by executing an access directory protocol (e.g. LDAP).

The webserver 206 may generate and serve webpages associated with the valuation software application to the user-computing device 210 based upon information associated with the user and structure of the interactive graphical user interface of the user-computing device 210. The information associated with the user may be defined by data fields in user records stored in the local memory. The webserver 206 may conduct an authentication of the user by executing an access directory protocol. Upon authentication, the webserver 206 may generate the webpages as described herein.

The user-computing device 210 is a computing device including a processing unit. The processing unit may execute a valuation software application or a web browser application that accesses or receives data records from the database 208. The processing unit may include a processor with computer-readable medium, such as a random access memory coupled to the processor. The user-computing device 210 may be running algorithms or computer executable program instructions, which may be executed by a single processor or multiple processors in a distributed configuration. The user-computing device 210 may interact with one or more software modules of a same or a different type operating within the system 200.

Non-limiting examples of the processor may include a microprocessor, an application specific integrated circuit, and a field programmable object array, among others. Non-limiting examples of the user-computing device 210 may include a server computer, a workstation computer, a tablet device, and a mobile device (e.g., smartphone, PDA). An end user (inputting the data or filling out the electronic form) may operate the user-computing device 210. The user may be a client of the financial company. For ease of explanation, FIG. 2A illustrates a single computing device functioning as the user computing device 210. However, some embodiments may include a plurality of computing devices capable of performing the tasks described herein.

The database 208 associated with the analytics server 204, the webserver 206, the data sources 102, and the user-computing device 210 is capable of storing information in various formats and/or encrypted versions. The information may include data records associated with various companies utilizing the webserver 206, data records associated with the webserver 206, user preferences, a set of prompts (e.g., question, query, inquiry), attributes associated with various graphical user interfaces to be generated by the analytics server 204, and the like. The database 208 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 208 is shown as a separate computing feature, the database 208 may be a part of a computing environment that includes the webserver 206. For instance, the database 208 and the webserver 206 may belong to a merchant computing environment where the webserver 206 retrieves merchant data from the database 208 to host a website.

Utilizing the web browser executing on the user-computing device 210, a user may generate a request that can be transmitted to the analytics server 204 and/or the webserver 206. Specifically, the user may request to fill out an electronic form and submit the form using a website generated by the webserver 206. As a result, the webserver 206 may instruct the analytics server 204 to generate a chat-like intelligent data input form to collect the user's information. The request may also include data associated with the user (e.g., demographic data and/or user preferences) and data associated with the user's request (e.g., attributes of the form to be filled out by the user, number and sequence of prompts to be displayed, and various disclaimers associated with the user's request).

The analytics server 204 may then generate various graphical user interfaces that represent a chat-like intelligent data input form designed to interact with the user operating the user-computing device 210. The analytics server 204 may then generate various interactive graphical user interfaces and may instruct the webserver 206 to incorporate the generated graphical user interfaces within the website displayed on the user-computing device 210. The analytics server 204 and/or webserver 206 may display the graphical user interfaces generated by the analytics server 204 in a manner that is indistinguishable from the website hosted by the webserver 206. For instance, the graphical user interfaces generated by the analytics server 204 may be implemented/embedded within the website generated/hosted by the webserver 206, such that they share the same look and feel. In this way, the user is not directed to a new webpage and seamlessly interacts with the chat-like data input forms.

The analytics server 204 and/or webserver 206 may monitor the user's interactions with the graphical user interfaces generated by the analytics server 204. For instance, the analytics server 204 and/or the webserver 206 may record data inputted by the user and may transmit the recorded data (e.g., submitted application) to another server for processing.

Figure 2B:
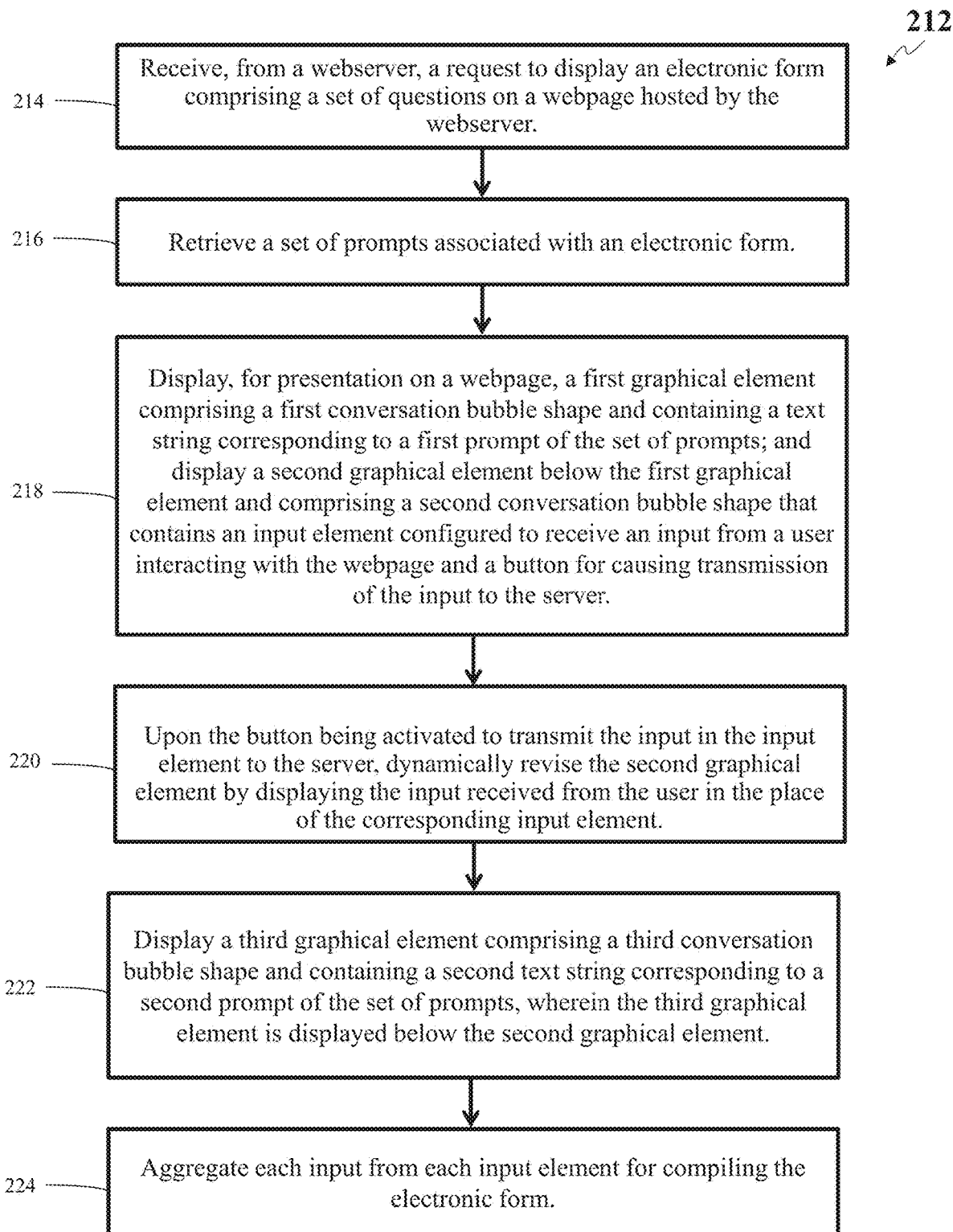
FIG. 2B illustrates a flowchart depicting operational steps for a chat-like data input method/system, in accordance with an embodiment.

FIG. 2B illustrates a flowchart depicting operational steps for a chat-like data input method/system, in accordance with an embodiment. The method 212 describes how a server, such as the analytics server described in FIG. 2A, displays various interactive graphical user interfaces configured to receive users' inputs. Even though the method 212 is described as being executed by the analytics server, the method 212 can be executed by any server and/or locally within a user's computing device or as a browser extension.

Additionally or alternatively, the method 212 can be executed by a webserver acting as both a webserver and the analytics server by hosting the website and generating the graphical user interfaces described herein. Furthermore, other configurations of the method 212 may comprise additional or alternative steps, or may omit one or more steps altogether.

At step 214, the analytics server may receive, from a webserver, a request to display an electronic form comprising a set of prompts on a first webpage hosted by the webserver. The analytics server may receive a request from a webserver to generate one or more dynamic chat-like graphical user interfaces configured to receive a user's data. The request may be generated and transmitted by the webserver hosting a website accessed by a user on his computing device. For instance, a user may initiate a web browser application and access a website generated/hosted by webserver. Non-limiting examples of websites may include merchant websites providing goods and services to users on the World Wide Web.

In a non-limiting example, a user may interact with a graphical element displayed within the website hosted by the webserver and indicated a desire to submit an application or access an electronic form. In order to submit his application, the user may be required to provide various data (e.g., demographic data). As described above, conventional software solutions provide static prompts and answers where the user can read the question and provide his answer by inputting data within the input fields. As described in the method 212, the webserver may request the analytics server to generate dynamic and chat-like graphical user interfaces in order to enhance and improve the user's experience.

The request received by the analytics server may include preliminary data associated with the user. For instance, before requesting to submit his application, the user may provide his demographic information. For instance, the user may login the website provided by the webserver. As a result, the webserver may access the user's demographic data previously inputted by the user and/or retrieved from a third party. When transmitting the request to the analytics server, the webserver may include the user's demographic data and any other data included in the user's profile, such as user preferences or other data enriched by third-party data sources.

The webserver may also include data associated with the user's device, such as IP address, location data, MAC address, and the like. The request may also include attributes associated with the electronic form requested by the user (e.g., electronic form identifier). For instance, the webserver may indicate which form has been requested by the user (e.g., credit card form). As will be described below, the analytics server may use this data to retrieve relevant prompts, their respective sequence of display and various other data associated with the electronic form (e.g., disclaimers).

At step 216, the analytics server may retrieve a set of prompts associated with an electronic form. The analytics server may also retrieve a corresponding sequence/order for displaying the retrieved prompts. Upon receiving the request from the webserver, the analytics server may query and retrieve data to be displayed within the dynamic and chat-like graphical user interfaces from a data repository (e.g., database described in FIG. 2A). The analytics server may use the data included within the request (received from the webserver in step 214) to retrieve a set of prompts (e.g., questions) relevant to the user's request (e.g., associated with the requested electronic form). The analytics server may also retrieve an order (if any) associated with the prompts. For instance, the webserver or a system administrator may identify an order in which the prompts must be presented.

In a non-limiting example, a user may access a website hosted by the webserver and request to submit an application for a credit card. The webserver may generate and transmit a request to the analytics server that includes the user's demographic data (e.g., login or account name) and/or information associated with the credit card application (e.g., name of the credit card requested by the user). As a result, the analytics server may query a database (internal and/or external to the webserver) using the information included in the request received from the webserver. The analytics server may then retrieve a set of prompts associated with the credit card application, a sequential order associated with the prompts (e.g., a predetermined order of how the webserver desires to display the prompts), and any data associated with the user (e.g., users preferences and demographic data, such as home address, contact information, and the like).

The analytics server may also retrieve various information designated by the webserver that are associated with the request. For instance, the webserver may have predetermined rules associated with each application. For example, for a particular credit card application, the webserver may have previously requested the analytics server to display one or more disclaimers and ensure that the user has reviewed and accepted the disclaimers before submitting the application. As will be depicted and described below, the analytics server may retrieve the disclaimers and display them according to the predetermined rules set by the webserver or a system administrator.

At step 218, the analytics server may display, for presentation on a webpage, a first graphical element comprising a first conversation bubble shape and containing a text string corresponding to a first prompt of the set of prompts. The analytics server may also display a second graphical element below the first graphical element and comprising a second conversation bubble shape that contains an input element configured to receive an input from a user interacting with the webpage and a button for causing transmission of the input to the server.

The analytics server may display the graphical elements in conversation bubble shapes. A conversation bubble (e.g., dialogue balloon) may be any predetermined graphical element configured to emulate an electronic conversation with the user. The analytics server may display the conversation bubbles in accordance with predetermined and revisable visual attributes. The analytics server may retrieve the visual attributes corresponding to the conversation bubbles (e.g., font, text size, shape, and/or color) along with the set of prompts (step 214). For instance, the webserver (or a system administrator) may identify default visual attributes for the conversation bubbles and the analytics server may display various prompts and input elements within conversation bubbles having those attributes, as depicted in FIGS. 3-10.

The conversation bubble shape may be adjusted in size based on the amount of content or sizes of input elements and/or buttons within the first graphical element. The conversation bubble shape is intended to resemble the look-and-feel of a conversation between two or more users, such as using text messaging. So the conversation bubble shape can have a rectangular shape, with or without rounded corners, and one corner can converge at a point on a left side or a right side of the display. The point may be on the left side for a first speaker, and the point may be on the right side for a second speaker. In the example embodiment shown, the point is on the left side for the graphical elements containing prompts from the server, and the point is on the right side for the graphical elements having an input from the user. The conversation bubble shape and alternating pointed ends have the look-and-feel of a conversation while inputting information to complete an electronic form.

The analytics server may display two graphical elements where the first graphical element corresponds to a first prompt retrieved from the database (e.g., the first prompt of the electronic form requested by the user). The analytics server may display a second graphical element that comprises various input fields associated with a response to the first prompt.

The analytics server may display two graphical elements corresponding to the first prompt from the set of prompts retrieved. The first graphical element may directly correspond to a first prompt within the set of prompts retrieved. The second graphical element may correspond to input fields configured to receive the user's response to the prompt presented within the first graphical element. An example of the first graphical element may include the graphical element 502 depicted FIG. 5. An example of the second graphical element may include the graphical element 504 displayed in FIG. 5.

The analytics server may display the first graphical element in a visually distinct manner when compared to the second graphical element. The analytics server may emulate an electronic conversation (e.g., text message conversation or chatting with another user on an electronic platform) by displaying the graphical elements in a visually distinct manner from each other. For instance, the graphical element 502 may be a different color than the graphical element 504. Specifically, the analytics server displays the graphical elements using different colors to create the illusion that the user is having a conversation with the analytics server. As will be described below, the analytics server may augment this illusion by relocating various graphical elements in a manner that is consistent with an electronic chat session. In some configurations, the analytics server may display all the graphical elements presenting prompts in a manner that is visually distinguishable from all the graphical elements that include input fields.

Visual attributes associated with the first and/or second graphical elements may be consistent with the data retrieved from the database. For instance, the webserver may previously identify visual elements associated with the graphical user interfaces generated by the analytics server. Non-limiting examples of visual elements may include font type, font size, spacing, type of input element (e.g., radio button, text string input, and/or drop-down menu), and the like. Additionally or alternatively, a system administrator and/or the user may revise these visual elements. For instance, a user may select bigger fonts or a type of input field (e.g., some users rather input their responses using interactive buttons and some users rather type their responses).

The second graphical element may also include an interactive button for causing transmission of the input to the analytics server. The analytics server may display an interactive link within the second graphical element allowing the user to confirm inputting his response. The analytics server may display the interactive link as an interactive button (e.g., the interactive button 510, depicted in FIG. 5) or any other interactive element. The user may interact with the interactive link to indicate that user has inputted his response to the displayed prompt (first graphical element).

Additionally or alternatively, the analytics server may instruct the webserver to display a subset of the set of prompts, wherein the server causes the webserver to display the set of prompts in accordance with the graphical user interfaces generated by the analytics server. The analytics server may generate various graphical user interfaces as described below and depicted in FIGS. 3-10. The analytics server may also instruct the webserver to embed the graphical user interfaces within the website generated/hosted by the webserver. In a non-limiting example, the analytics server may access software scripts (e.g., HTML code) associated with the website and may reconfigure the scripts, such that the newly generated graphical user interfaces are embedded within the website.

Referring back to FIG. 2B, at step 220, upon the button being activated to transmit the input in the input element to the server, the analytics server may dynamically revise the second graphical element by displaying the input received from the user in the place of the corresponding input element. As described above, the analytics server may display the second graphical element that includes various input elements and an interactive button. The user may utilize the input elements to input a response to the prompt displayed within the first graphical element (e.g., chat bubble displaying the prompt). When the user desires to submit his responses, the user may interact/activate the interactive button. When the analytics server receives an indication that the interactive button has been activated, the analytics server determines that the user has submitted his response and revises the second graphical element as described herein.

Upon displaying the first and/or the second graphical elements, the analytics server may monitor the user's interactions with the input fields within the second graphical element. When the user interacts with one or more input elements of the second graphical element (e.g., when a user inputs and/or submits a response), the analytics server may revise the second graphical element by removing the input elements and displaying the user's responses within the revised second graphical element.

The analytics server may dynamically revise the second graphical element when the user submits his response (input). For instance, as depicted in the graphical element 702 in FIG. 7, the analytics server may remove the input fields and interactive buttons associated with the graphical elements 702 (e.g., interactive buttons 512A-C and input fields 506 and 508, and the interactive button 510, depicted in FIG. 5). The revised graphical element may include the result and responses inputted by the user. The revised graphical element may also include an interactive button allowing user to revert to an "un-revised" version of the graphical element (e.g., the graphical element displaying various input fields and interactive buttons) to edit his response. In some configurations, the analytics server may also relocate the second graphical element. For instance, similar to relocation of the first graphical element, the analytics server may move the revised second graphical element (e.g., move up the revised second graphical element proportional to the relocated first graphical element).

Additionally or alternatively, the analytics server may revise the second graphical element by changing a visual attribute of the second graphical element. For instance, the revised second graphical element may be displayed in a different color or a different shade of the same color. This may indicate that the user has already inputted his response.

Figure 7:
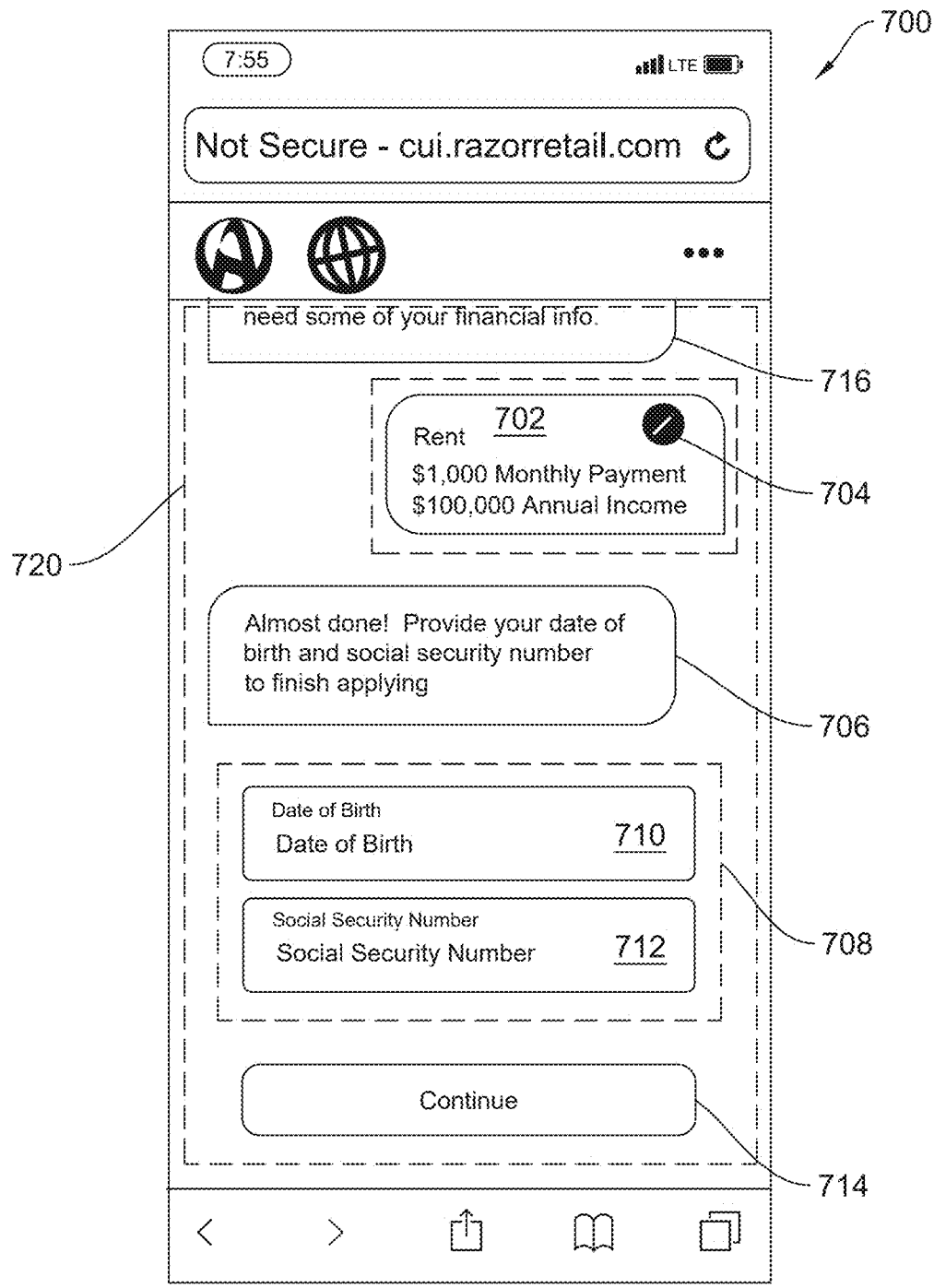

Additionally or alternatively, the analytics server may shift the graphical elements in a manner consistent with electronic communications (e.g., electronic chat sessions). For instance, as depicted in FIG. 7, the analytics server may relocate the first graphical indicator (graphical element 502 in FIG. 5) and display the graphical element 716. A non-limiting example of relocating a graphical element may be relocating the graphical element in an upward manner. This relocation may occur by adding a graphical element to the bottom of page and moving the display to show the most recent graphical elements, thereby appearing that the earlier graphical elements moved upwards. For instance, FIG. 7 depicts a chat screen 720 where older graphical elements that emulate conversation with the user may be shifted upward within the chat screen 720 as new prompts are displayed (e.g., graphical element 708). The analytics server may incrementally move all the graphical elements when new graphical elements are displayed. For instance, the analytics server may change the relative position of the graphical elements 716, such that the graphical element 716 exits the chat screen as newer graphical elements (e.g., graphical elements 708) are displayed.

Referring back to FIG. 2B, at step 222, the analytics server may display a third graphical element comprising a third conversation bubble shape and containing a second text string corresponding to a second prompt of the set of prompts, wherein the third graphical element is displayed below the second graphical element. The analytics server may display a third graphical element (having a third conversation bubble) corresponding to the next prompt within the set of prompts retrieved. In accordance with the predetermined order of prompt/questions, the analytics server may identify a next logical prompt and may display a third graphical element that displays a text string corresponding to the next prompt. Using the methods and systems described herein, the analytics server may continue the process described above and continuously display a sequence of prompts until every (or at least a part of) the retrieved set of prompts is displayed. When all or some of the set of prompts retrieved is displayed and responded to by the user, the analytics server may transmit the user's responses to the webserver.

Additionally or alternatively, when every prompt has been responded to, the analytics server may query and retrieve predetermined language associated with the electronic form and may display the predetermined text accordingly. For instance, the webserver may define various text strings associated with particular electronic forms (e.g., a disclaimer must be displayed along with a particular credit card application where the user must confirm that the user has read and understood the terms and condition).

At step 224, the analytics server may aggregate each input from each input element for compiling the electronic form. Using the methods and system described herein, the analytics server may iteratively display all prompts within the set of retrieved prompts (step 216). For instance, the analytics server may continue displaying chat-like graphical elements (conversation bubbles) corresponding to a "next" prompt within the set of prompts. When the analytics server receives the users input to all (or a predetermined portion) of the set of prompts, the analytics server may aggregate the user's responses to each input and may transmit the aggregated responses to a server, such as the webserver or any other server associated with the electronic form and/or the website. For instance, the analytics server may generate a file that includes all the user's responses and may transmit the file the webserver where the webserver can compile the electronic form/user's inputs by executing various analytical protocols using the user's responses (e.g., approve/deny the user's credit card application).

Referring now to FIGS. 3-10, non-limiting examples of the graphical user interfaces described herein is illustrated. Even though FIGS. 3-10 illustrate a progression in sequential graphical user interfaces, in some configurations the analytics server may display the depicted graphical user interfaces in another order. Moreover, the analytics server may not display one or more of the graphical user interfaces described herein. The analytics server may display various combinations and configurations of the graphical user interfaces depicted herein.

The graphical user interfaces depicted in FIGS. 3-10 illustrate one or more graphical user interfaces displayed by the analytics server through a webserver, as described in FIG. 1. For instance, a user may log into third party website and request various services where a webserver associated with the website (e.g., hosting the website) may communicate the information to the analytics server. The analytics server may in turn display the graphical user interfaces depicted herein using "look and feel" of the third-party website. Therefore, the user may not be required to leave the third-party website and/or initiate a new graphical user interface generated by the analytics server. In some configurations, however, the user may be directed to a new website where the analytics server displays the graphical user interfaces described herein.

Furthermore, the chat-like dynamic graphical user interfaces described herein are depicted as having a chat window that consumes the entire display screen of the electronic device operated by the user. In some configurations, the chat screen may be smaller or may be displayed within a predetermined portion of the display screen.

Figure 3:
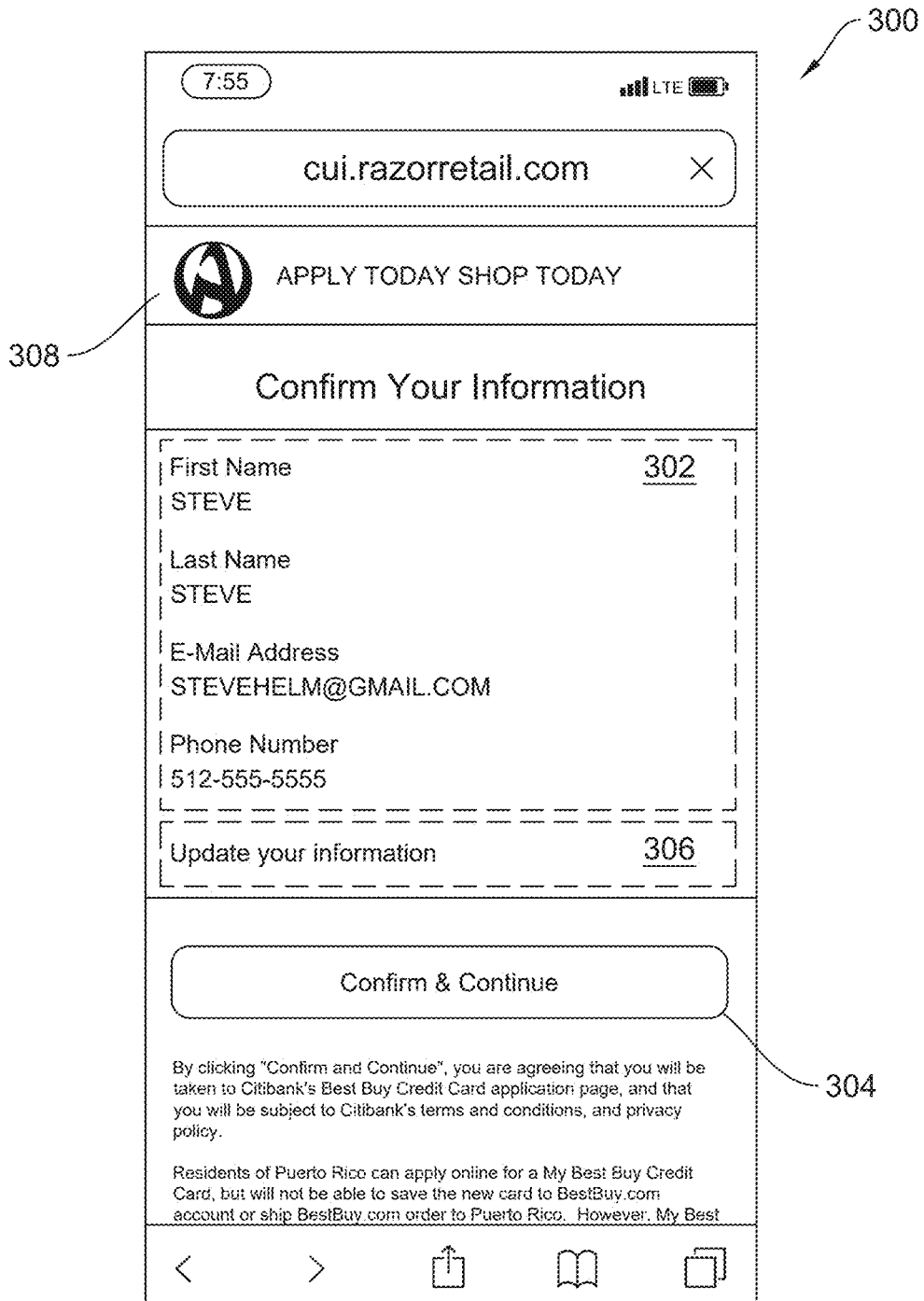
FIGS. 3-10 illustrate various graphical user interfaces displayed by the analytics server, in accordance with different embodiments.

As depicted in FIG. 3, an end-user may initiate a web browser on his mobile application and direct the web browser to a website configured to receive his financial information and submit an application for a credit card. When the user submits his request to apply for a credit card, a webserver associated with the website may generate a call to the analytics server. The call may correspond to sending a notification to the analytics server where the notification indicates that a user has requested to apply for a credit card. The analytics server may then use the methods and systems described herein to display the graphical user interfaces described herein and to display dynamic questionnaires, such that the end user inputs his information in a chat-like fashion.

Upon receiving the notification from the webserver, the analytics server may first retrieve demographic data associated with the user. The analytics server may receive user identification data from the webserver, such as login information and/or device identification data (e.g., IP address, locations information, or MAC address). Upon receiving the identification from the webserver, the analytics server may query and retrieve data associated with the user. The analytics server may also pre-fill various input elements for the user's review, such that the user is not required to provide that information. In some configuration, if the analytics server identifies a response to a prompt, the analytics server may no longer display the dynamic input fields corresponding to that particular prompt.

The GUI 300 illustrates an initial graphical user interface displayed by the analytics server. The analytics server may display demographic or other data retrieved within the graphical element 302. The analytics server may then provide the option for the user to review and confirm the data retrieved. If the user agrees with the data displayed within the graphical element 302, the user may interact with the interactive button 304 to proceed to the next step. If the user does not agree with the data displayed within the graphical element 302, the user may interact with the hyperlink 306 and update his information. If the user interacts with the interactive button 304, the analytics server proceeds to FIG. 4 (the GUI 400). The GUI 300 may also include a logo of the webserver (hosting the webpage), as depicted by the graphical indicator 308.

The GUI 400 includes the graphical element 402, which displays various demographic data associated with the user. As described above, the analytics server provides the user with an option to edit his information. The GUI 400 may also include the graphical indicator 406 indicating that the webpage (GUI 400) is generated by the analytics server but embedded within a webpage hosted by the webserver (associated with the credit card company or the merchant). If the user agrees with the displayed information, the user interacts with the interactive button 404 to proceed to the next step (the GUI 500).

In the GUI 500, the analytics server displays a first graphical element that represents a conversation between an agent of the third-party website and the user. For example, graphical element 502 represents a statement, prompt, or question posed by a representative of the website. As described above, the graphical element 502 may include a chat-like statement, prompt, or question (e.g., string of characters) asking the user one or more questions. The analytics server may also display the graphical element 504, which may include one or more input fields configured to receive the user's response to the prompt posed/displayed in the graphical element 502. When displaying the graphical element 502, the analytics sever may relocate the graphical element 510 (formerly graphical element 402) within the display screen. The analytics server may continuously relocate "older" graphical elements when "newer" graphical elements are displayed. For instance, the analytics server may move a graphical element out of the chat screen (e.g., move up within the GUI 500) as new graphical elements replace them. Even through in the depicted embodiment illustrates relocating the graphical element 510 in an upward direction, the analytics server may relocate the "older" graphical element to any directions within the display screen.

In the depicted example, the analytics server displays a chat-like statement within the graphical element 502 informing the user that the analytics server will display another graphical element for acquiring more information. After displaying the graphical element 502, the analytics server may display the graphical element 504. In some embodiments, the analytics server may display the graphical elements 502 and 504 simultaneously. In other embodiments, the analytics server may display the graphical element 504 within a predetermined amount of time subsequent to displaying the graphical element 502 (e.g., 2, 5, or 10 seconds). The predetermined amount of time between displaying the graphical element 502 and graphical element 504 may be revised by the end user and/or the webserver associated with third-party website. For instance, if the user desires, the user may edit how slow/fast prompts and/or input elements are displayed.

The analytics server may display the graphical elements 502 and 504 in a chat-like manner. For instance, the analytics server may display the graphical element 502 and inform the user that the user must input his financial information. After a predetermined time, the analytics server may relocate the graphical element 502 (e.g., move the graphical element 502 in a higher location within the display screen or GUI 500). The analytics server may also display the graphical elements 502 and 504 in a visually distinct manner. For instance, as customary in chat and messaging applications, the analytics server may display the graphical element 502 in a different color than the graphical element 504. In some configurations, the analytics server may display all graphical elements displaying a prompt and/or statements in a first color (e.g., blue). The analytics server may display all graphical elements corresponding to input elements and statements inputted by the user in a second color (e.g., gray or white).

The graphical element 504 may include various input elements. For example, input elements may include interactive buttons 512A-C where a user can select an option. The user may interact with any of the interactive buttons to input his answer. The graphical element 504 may also include text input fields where the user can input a text string (e.g., alphanumerical string). In some embodiments, each input field may include a statement indicating a category of inputs needed. For instance, interactive buttons 512A-C may include a statement "residence status." Each interactive button 512A-C may also include a statement representing an answer (e.g., "rent," "own," or "other"). The input fields 506 and 508 may also include statements indicating the required input from the user. For instance, input fields 506 indicates that the user is required to input his monthly payment.

When the user interacts with any of the interactive buttons 512A-C, the analytics server may display that particular interactive button in a visually distinct matter. For instance, if the user interacts with the interactive button 506B, the analytics server may display the interactive button 602, as depicted in GUI 600 and FIG. 6.

When the user interacts with the input fields 506 or 508, the analytics server may display the graphical component 604, which may include an interactive keyboard allowing the user to input his answers. The analytics server may also display the response inputted by the user, as depicted in the interactive button 606 (e.g., the user has reported a monthly income of $1000). In some configurations, when the user interacts with an input field, the analytics server may display a description of the type/category of the response needed. For example, when the user interacts with input field 608, the analytics server may display the graphical element 610 describing what constitutes annual income. Upon inputting his responses while interacting with the graphical component 604, the user may interact with the graphical element 612 to submit his responses. If the user submits his responses, the analytics server may proceed to the next step (GUI 700).

As described above, various graphical attributes of the graphical user interfaces shown herein can be customized and revised by the end user and/or the webserver hosting the third-party website. For instance, the analytics server may design and display colors, fonts, shapes, and other graphical attributes of each interactive button, input element, and/or other graphical elements/components/indicators in accordance with predetermined preferences received from the user and/or the webserver.

In FIG. 7, the analytics server displays the graphical user interface 700 when the analytics identifies an indication that the user has submitted his inputs. When the user interacts with the graphical element 612, the analytics server generates the graphical element 702, which corresponds to inputs received via the user interacting with the graphical element 502. The graphical elements 702 may include the graphical indicator (e.g., an interactive button) 704 which allows the user to re-access input fields associated with the prompt presented (e.g., input fields 606 or 608 and the interactive buttons 602). In this way, the user may edit his answers.

The graphical component 702 also includes a summary of the values inputted by the user, as previously shown and described. For instance, the graphical component 702 indicates that the user has indicated that he is renting his place of residence for $2000 a month and his income is hundred thousand dollars a year.

The analytics server may display the graphical element 702 in a chat-like manner (e.g., move the graphical elements 702 higher within the GUI 700 as the analytics server displays the graphical element 706). After displaying the graphical element 702, the analytics server may retrieve a subsequent prompt and display a corresponding graphical element 706. As depicted, the graphical element 706 describes that a subsequent prompt will inquire about the user's date of birth and Social Security number.

The analytics server may then display the graphical element 708, which includes the input fields 710 and 712. These input fields may be configured to receive data inputted by the user. The graphical element 708 also includes the interactive button 714, which indicates that the user is willing to submit his responses and move forward in the application process. When the user interacts with the interactive button 714, the analytics server moves to GUI 800, depicted in FIG. 8.

Figure 8:
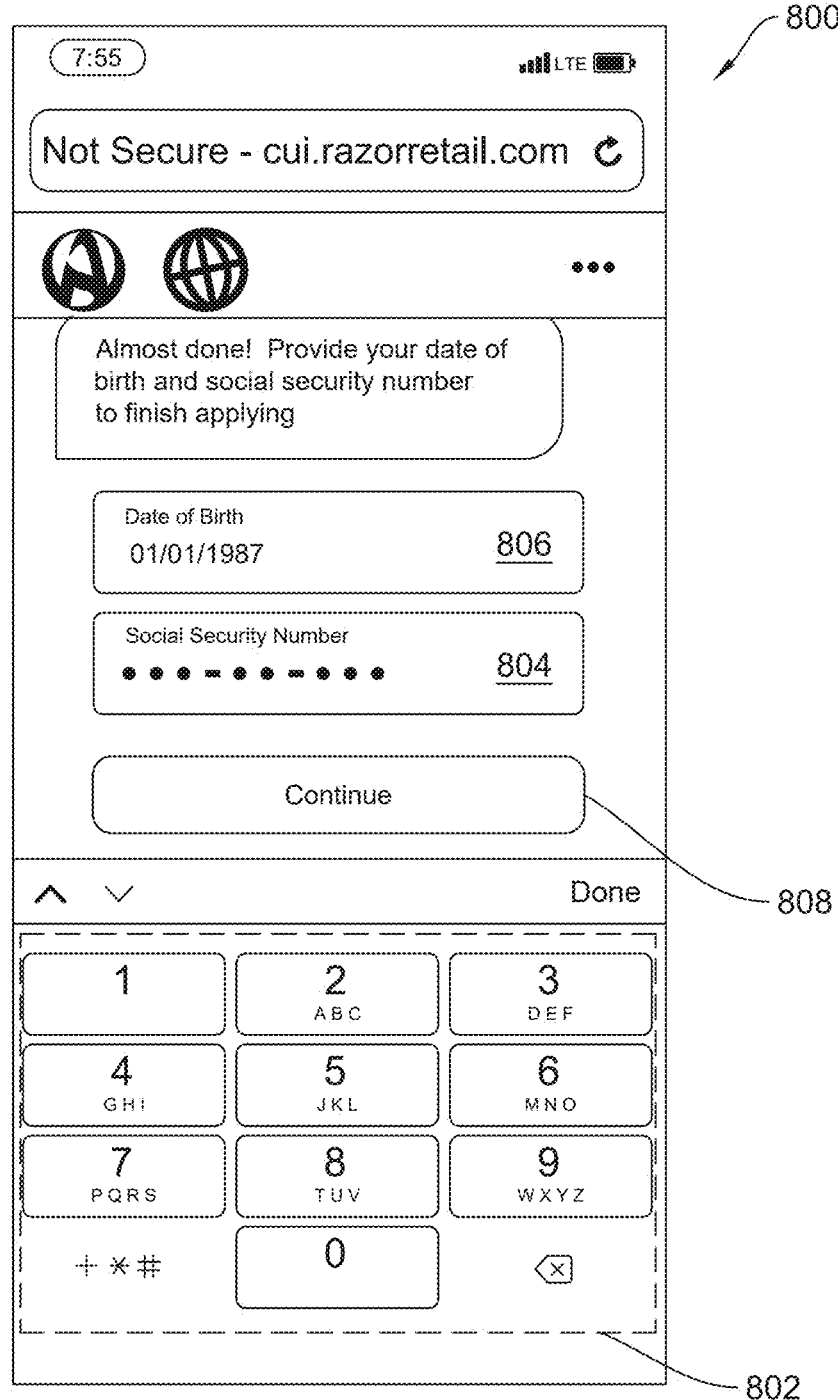

As depicted in FIG. 8, the user may interact with the graphical element 802 to input his responses using the input elements 804 and 806. In some configurations, as depicted in FIG. 8, the analytics server may obfuscate the responses inputted by the user. For instance, the analytics server may obfuscate the responses inputted into the input element 804. Upon the user interacting with the interactive button 808, analytics server moves to the next step (e.g., GUI 900). When the analytics server identifies that the user has interacted with an input element/field, the analytics server may also relocate the graphical element 706 in the manner depicted in FIG. 8.

Figure 9:
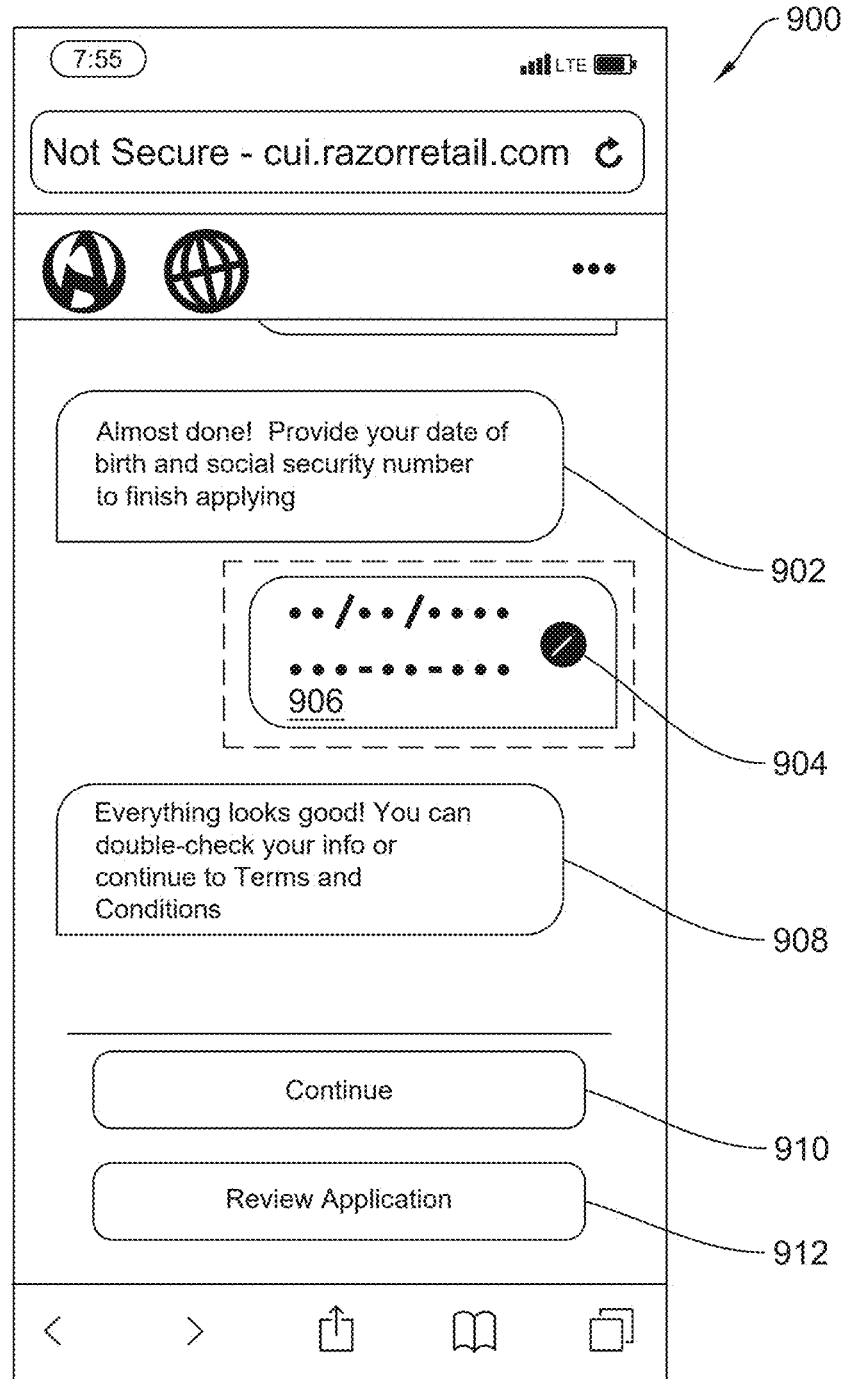

As depicted in FIG. 9, the analytics server may relocate the graphical elements 706 (relocated into graphical element 902). The analytics server may also display the graphical element 906, which represents the values inputted into the input elements 804 and 806. As depicted, the analytics server may obfuscate the answers such that a person viewing the graphical user interface 900 may not identify the user's Social Security number or other personally identifiable information. The analytics server may also display the graphical indicator (interactive button) 904 allowing the user to edit his inputted information. After displaying the graphical element 904 (e.g., instantaneously or after a predetermined amount of time), the analytics server may determine that all necessary prompts have been responded to. The analytics server may query a database having a sequence of prompts and may identify that the user has responded to the last prompt necessary to submit his application. As a result, the analytics server may display the graphical element 908 indicating that the user has finished the application.

The analytics server may also display the interactive button 910 and 912. If the user interacts with the interactive button 910, the analytics server may move to GUI 1000, depicted in FIG. 10. If the user interacts with the interactive button 912, the analytics server may display the user's responses and/or corresponding prompts, such that the user is able to review his responses before submitting the application.

Figure 10:
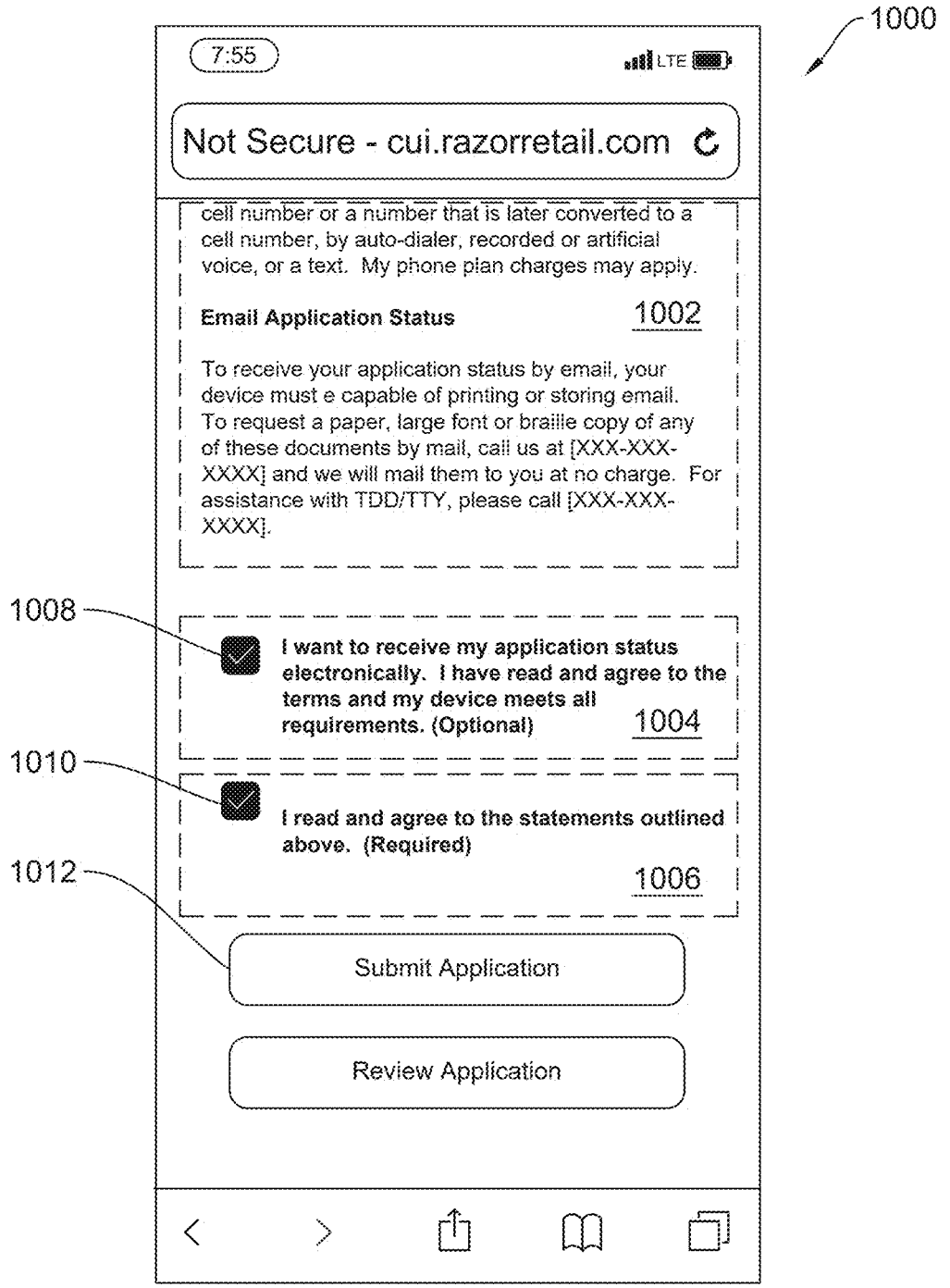

As depicted in FIG. 10, the analytics server may retrieve disclaimer language necessary with the application and may display the disclaimer language within the graphical element 1002. The disclaimer displayed within the graphical element 1002 is customizable and may be revised by the webserver of the third-party website. The disclaimer also corresponds to the application displayed throughout FIGS. 3-9. For instance, if the application requested by the user is a credit card application, the analytics server may retrieve a corresponding disclaimer (e.g., a disclaimer needed for all credit card applications and/or a disclaimer needed for that particular credit card application) and may display the disclaimer accordingly. As described throughout, the language of the disclaimer is customizable and may be revised by a system administrator or the webserver.

In some embodiments, the analytics server may also display various verification steps, as dictated by a system administrator or the webserver. Specifically, the analytics server may display graphical elements 1004 and 1006 with interactive buttons 1008 and 1010 allowing the user to confirm that he has reviewed, agrees with the disclaimer, and accepts the terms and conditions of the application. The content of the verification steps may also be inputted and/or revised by a system administrator and/or the webserver. For instance, when generating various graphical user interfaces, system administrator operating the webserver may instruct the analytics server to include various verification steps before the application is submitted. The system administrator may interact with a graphical user interface provided by the analytics server to input the content of each verification (e.g., text of the verification steps).

The analytics server may also display the interactive button 1012 that allows the user to submit his application. When the user activates/interacts with the button 1012, the analytics server may aggregate the responses inputted by the users and may transmit the user's responses to the webserver. The webserver may then analyze the user's responses and approve/deny the user's application. Upon receiving an instruction from the webserver, the analytics server may also display a notification informing the user of the application status.

Figure 11:
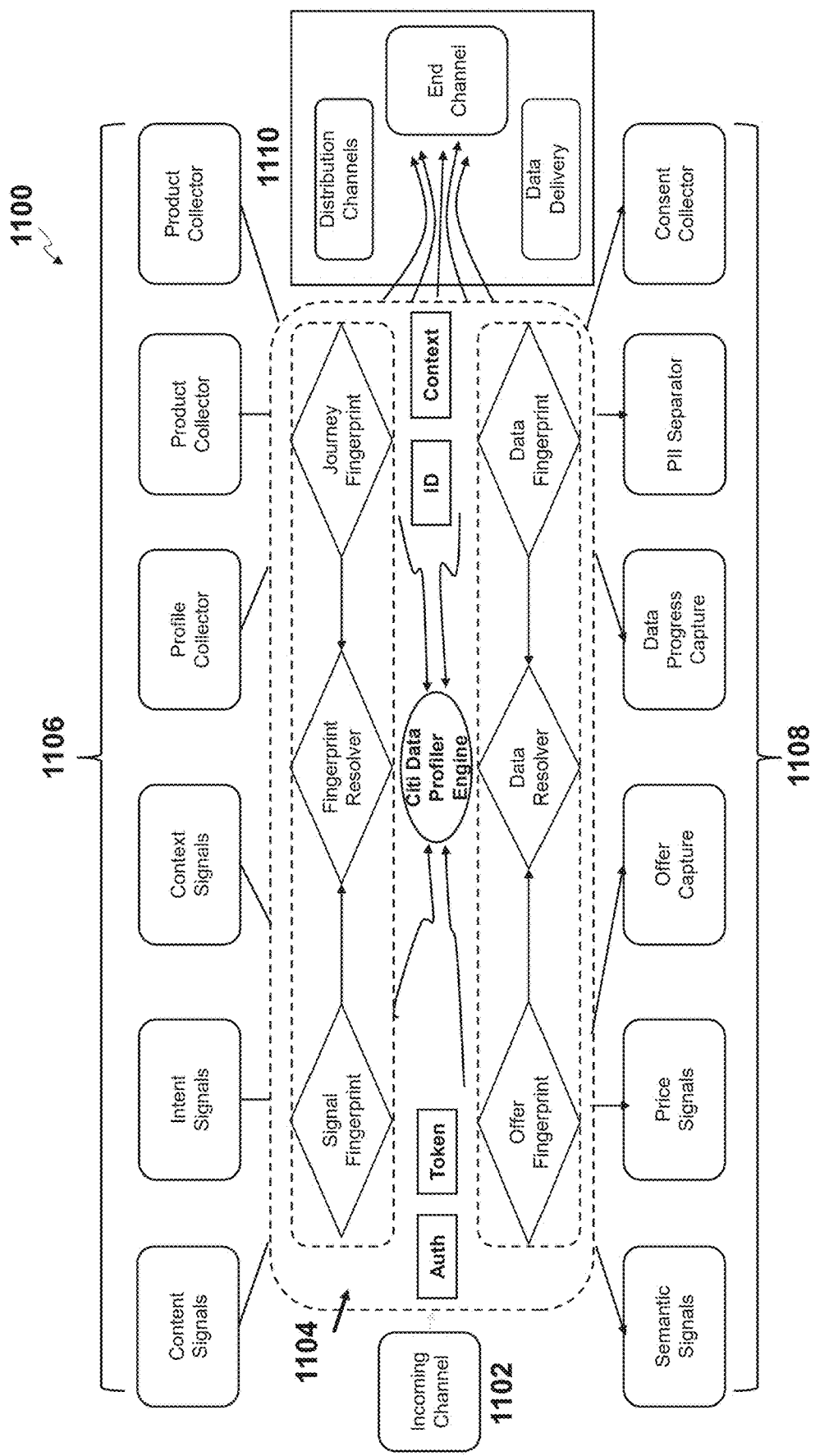
FIG. 11 illustrates a system to save and resume progress of an electronic application, in accordance with different embodiments.

FIG. 11 illustrates a system 1100 for saving and resuming progress of an electronic application. The system 1100 may be a particular implementation of the system 200. The system 1100 can utilize digital fingerprinting and the systems and methods described above to capture the progress of individuals users of the system 200. In this manner, the system 1100 can personalize the content displayed on the user interface of the user computing device 210, save progress achieved by the user computing device 210 in the electronic application, and determine the next steps for the user computing device 210 in the event that the user abandons the electronic application. In response to the user abandoning the electronic application, the system 1100 can save the progress, attributes, information, and other data associated with the electronic application.

Utilizing the progress, the system 1100 can resume the electronic application upon detection of the user computing device 210 accessing the application in real time. Unlike conventional solutions which initiate a timer to automatically log out a user after a period of activity, the systems and methods described herein create a profile for the user based on information gathered from the electronic application. Therefore, regardless of the period of inactivity, the user can securely resume the electronic application based on the profile. The systems and methods described herein maintain APIs for the analytics server 204 and the webserver 206 to execute the profile match to improve privacy and resume the electronic application in real time.

The system 1100 can generate an identifier for the user of the user computing device 210 to resume the electronic application in real time. Upon presentation of the identifier, the system 1100 can verify, authorize, or otherwise authenticate the user by comparing the identifier to the information within the profile. Therefore, the system 1100 can quickly and securely access the electronic application while improving the human-computer interaction (HCI) between the user and the user computing device 210 and improving utilization of computing resources by receiving inputs to the electronic application once, prior to the submission of the electronic application. In this manner, the system 1100 can further save computing resources, by converting abandoned applications into new accounts for the user computing device 210 by utilizing the identifier and the profile storing user information. Furthermore, the system 1100 can reduce decrease funnel degradation by giving user the ability to resume their position within the electronic application, ultimately leading to more new accounts while allowing customers re-entry in the most convenient method to the user.

The system 1100 can include at least one incoming channel 1102, at least one profile engine 1104, at least one signal 1106, and at least one end channel 1108. The incoming channels 1102 can transmit, send, or otherwise provide the respective electronic application from a plurality of user computing devices 210 to the profile engine 1104. The profile engine 1104 can generate, create, or otherwise determine a profile for each user computing device 210 in the plurality of user computing devices 210. The signals 1106 can transmit, provide, or otherwise send information from the user computing device 210 to the profile engine 1104. The end channels 1108 can transmit, send, or otherwise provide the profile to various webservers 206.

The incoming channels 1102 can correspond to pathways or streams in which data (e.g., electronic application) is received from the various components of the system 200. The incoming channels 1102 can facilitate transfers of the data from the components of the system 200 to the profile engine 1104. The incoming channels 1102 can identify at least one of a source of the data, a protocol of the data, a format of the data, or a medium of the data. The incoming channel can be at least one of network data channels, API endpoints, user input channels, database system, device data channels, among other data channels.

The profile engine 1104 can generate a profile for the respective user computing device 210. The profile engine 1104 can include at least one of an offer fingerprint, a data fingerprint, a data resolver, a signal fingerprint, a journey fingerprint, a fingerprint resolver among others. The profile engine 1104 can store data obtained from the incoming channels 1102 and the signals 1106. The signals 1106 can include data associated with the user computing device such as browser history, cookie data, cache memory, among others related to the electronic application. The signals 1106 can include content signals, intent signals, context signals, semantic signals, price signals, among other types of signals related to the electronic application. Each of the signals 1106 can be transmitted from a plurality of data sources associated with the computing device. The data sources can include websites, web browsers, external servers, among other data sources.

The profile engine 1104 can utilize fingerprinting (e.g., offer fingerprint, data fingerprint, journey fingerprint, and signal fingerprint) to generate the profile for the user, where the fingerprint may represent a device location, IP address, hardware, software, browser, websites visited, and/or other data representing online activity. The plurality of signals 1106 and the incoming channel 1102 can be fed into the profile engine 1104 to generate the profile for the user. The profile engine 1104 can use semantic signals 1106 (e.g., attributes of a product, impact of a product, etc.), price signals 1106 (e.g., price changes, discounts, etc.), and offer capture signal 1106 (e.g., interactions with the user). The profile engine 1104 can use data progress signal 1106 (e.g., recording specific pieces of information), personally identifiable information (PII) separator signal 1106 (e.g., isolate PII from non-sensitive data to improve privacy), and a consent collector signal 1106 (e.g., IP addresses, browser settings, collection data) to generate the data or digital fingerprint for the user. The profile generator 1104 can feed the offer fingerprint and the data fingerprint into the data resolver to partially generate the profile and generate the digital fingerprint for the user.

The profile engine can use content signals 1106 (e.g., patterns, markets, characteristics of digital content), intent signals 1106 (e.g., a user's interest, need, or engagement with a product), and context signals 1106 (e.g., metadata associated with the product) to generate the signal fingerprint. The profile engine 1104 can use profile collector signals 1106 (e.g., user behavior, user preferences, etc.), product collector 1106 (e.g., interactions with products on a webpage), and progress collector signals 1106 (e.g., user's progression through the webpage) to generate the journey fingerprint. The profile engine can feed the signal fingerprint and the journey fingerprint into a fingerprint resolver to partially generate the profile of the user. By utilizing the data resolver and the fingerprint resolver, the profile engine can generate the profile for the user to save and resume progress of the user, partially unfreeze and electronic account associated with a credit bureau, and partially authenticate various users accessing an electronic account.

The end channels 1108 can correspond to pathways or streams in which data (e.g., electronic application) is transmitted from the profile engine 1104. The end channels 1102 can facilitate transfers of the data from the profile engine 1104 to the components of the system 200. The incoming channels 1102 can identify at least one of a destination of the data, a protocol of the data, a format of the data, or a medium of the data. The end channel 1108 can be at least one of network data channels, API endpoints, user input channels, database system, device data channels, among other data channels. The end channels 1108 can include distribution channels and a data delivery to generate packets for the data.

Figure 12:
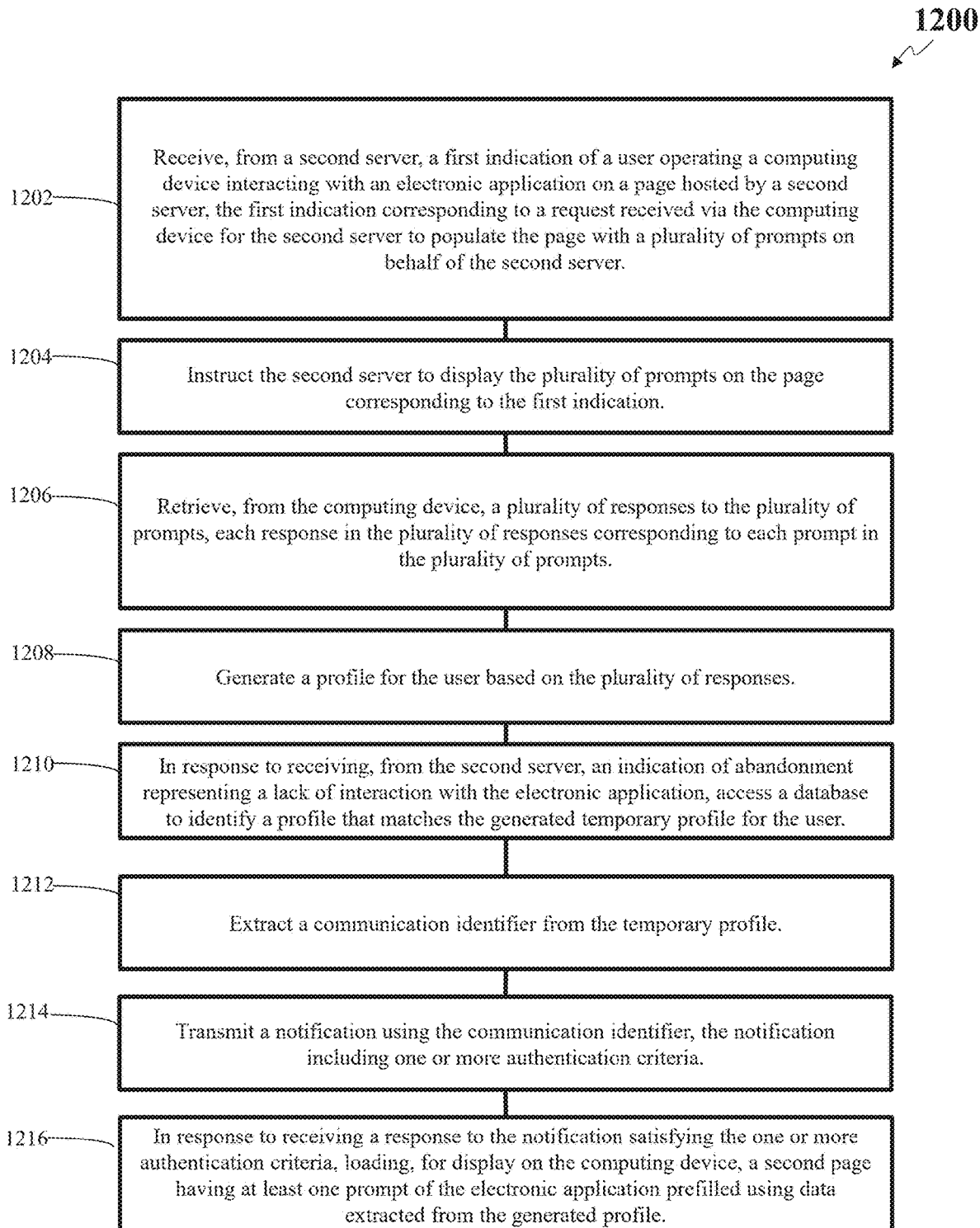
FIG. 12 illustrates a flowchart depicting operational steps to save and resume progress of the electronic application, in accordance with different embodiments.

FIG. 12 illustrates a flowchart depicting operational steps to save and resume progress of the electronic application. The method 1200 describes how a server, such as the analytics server described in FIG. 2, displays various interactive graphical user interfaces configured to receive users' inputs. Even though the method 1200 is described as being executed by the analytics server, the method 1200 can be executed by any server and/or locally within a user's computing device or as a browser extension. Additionally or alternatively, the method 1200 can be executed by a webserver acting as both a webserver and the analytics server by hosting the website and generating the graphical user interfaces described herein. Furthermore, other configurations of the method 1200 may comprise additional or alternative steps or may omit one or more steps altogether.

At step 1202, the analytics server can receive from a webserver, an indication of a user operating a computing device. The indication can indicate that the user is interacting with an electronic application on a webpage or website hosted by the webserver. The interactions can correspond to button clicks, keystrokes, text inputs, navigations, and the like. For instance, a user can click on buttons within graphical user interface elements of the electronic application on the webpage. The electronic application can correspond to credit card applications, financing applications, leasing applications, among others, on a merchant website providing goods and services to users on the World Wide Web.

In a non-limiting example, a user can interact with a graphical user interface element displayed within the webpage hosted by the webserver indicating a desire to obtain a product (e.g., credit card, financing option) associated with the webpage. The desire to obtain the product can correspond to the user interacting with an image of the product, interacting with a link to the product, reading a description of the product, searching for the product, among others. The analytics server can receive each of the indications of interactions and provide an electronic application based on an interaction with a graphical user interface element that is configured to provide the electronic application. From here, the analytics server can generate instructions for the webserver to fill the electronic application with a plurality of prompts according to the indication of the user interacting with the product and indicating a desire to obtain the product. In some instances, the indication of the user operating the computing device can correspond to a request received via the computing device for the second server to populate the webpage with the plurality of prompts on behalf of the webserver. The computing device can transmit the request to the analytics server in response to the user interacting with the computing device, prior to interacting with the electronic application.

At step 1204, the analytics server can instruct the webserver to display the plurality of prompts on the webpage corresponding to the indications of the interactions. The prompts can encourage the user to provide various data (e.g., demographics data, social security number, credit score, among others) to fill the electronic application. For instance, a first prompt can ask the user to provide an annual income within the application, whereas a second prompt can ask the user to provide their social security number as shown in FIG. 7. The plurality of prompts can include human readable phrases for the user of the computing device to respond. Some examples of the plurality of prompts can include "What is your annual income?", "Please provide your social security number," "What is your full name?", "Can you please verify your date of birth?" among other prompts. Upon reception of the instructions, the webserver can display the plurality of prompts within the electronic application on the computing device. In some instances, the analytics server can determine an order to display each prompt in the plurality of prompts using the interactions between the user and the webpage hosted by the webserver. For example, the analytics server can specify that a first prompt asking for a name of the user is to be displayed before a second prompt asking for an email of the user.

The user may interact with each prompt in the plurality of prompts by generating responses to each prompt. To generate the response, the user can insert text into the prompt, select a graphical user interface element within the prompt, select a graphical user interface element on the webpage, among other response options. For example, a first prompt may ask the user for a phone number, therefore the user can respond to the prompt with their phone number (e.g., 123-456-7890). In another example, the user can respond to a first prompt asking for the mortgage of the user. The computing device can detect each response to each prompt using one or more sensors associated with the user interface of the computing device. While detecting the responses, the computing device can transmit each response to the analytics server. In this manner, at step 1206, the analytics server can retrieve the plurality of responses to the plurality of prompts.

In a non-limiting example, a user may access a website hosted by the webserver and request to submit an application for a credit card to finance a product. The user can interact with an electronic application and provides the user's demographic data (e.g., login or account name) and/or information associated with the credit card application (e.g., name of the credit card requested by the user). The analytics server can generate instructions for the webserver to display a plurality of prompts (e.g., user home address, user income, user data of birth) associated with the electronic application and an order for each prompt. The computing device may detect a response to each prompt and transmit the responses to the analytics server. The analytics server can retrieve the responses from the computing device and store the responses within the database.

At step 1208, the analytics server can generate a profile for the user based on the plurality of responses. To generate the profile, the analytics server can access the plurality of responses from within the database to extract information (e.g., home address, first name, last name, occupation, etc.) about the user to formulate the profile. For example, the analytics server can extract a home address of the user from a response to a prompt. In another example, the analytics server can extract the social security number and annual income of the user. Once the information is extracted for a respective user, the analytics can generate the profile to include information extracted from each response. In some instances, the profile can include an identifier for the computing device (e.g., IP address, MAC address, device identifier).

Figure 13:
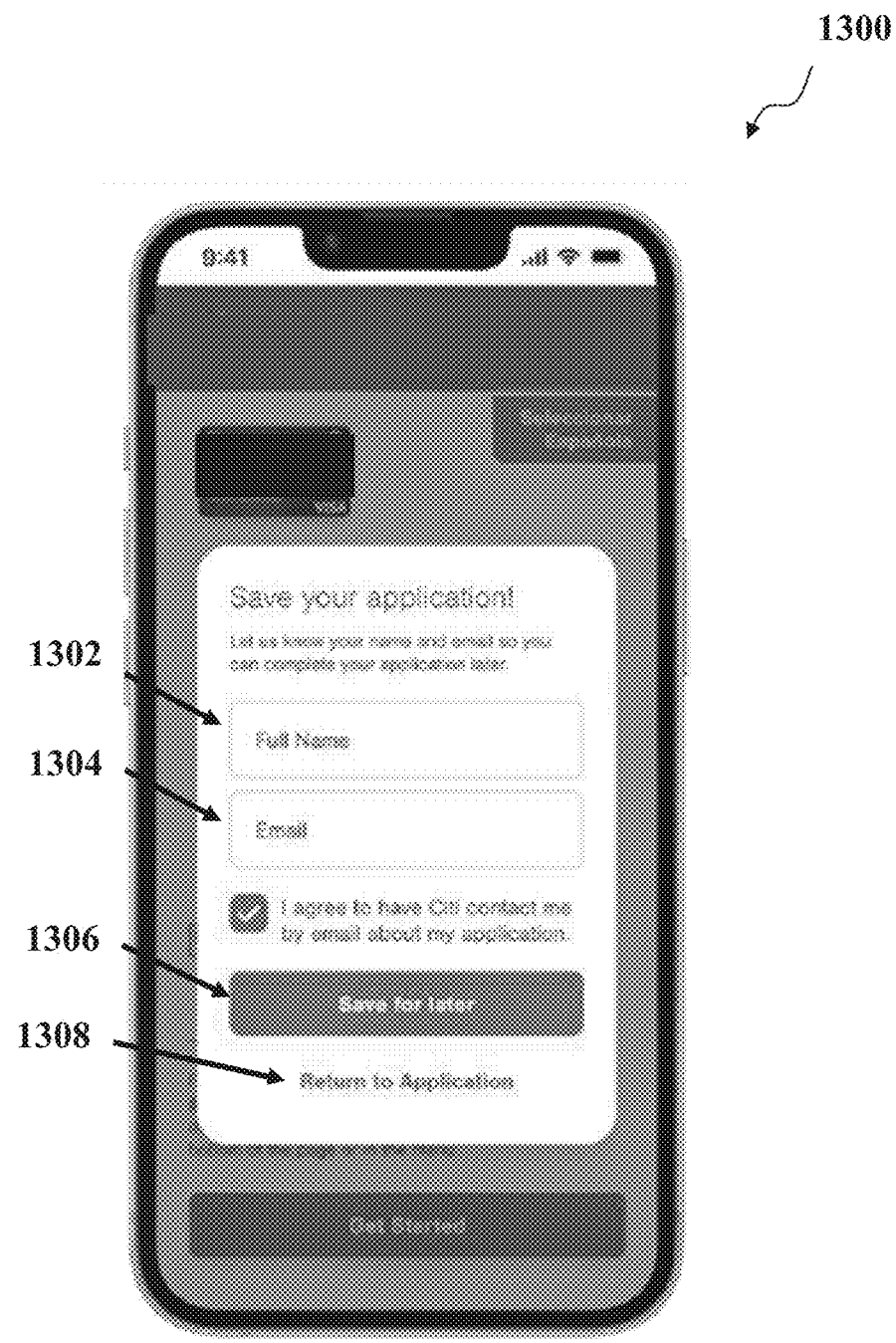
FIGS. 13-15 illustrate various graphical user interfaces displayed by the analytics server, in accordance with different embodiments.

During the generation of the profile at step 1208, the analytics server can further receive interactions between the user and the electronic application on the webpage. Therefore, the analytics server can further instruct the webserver to display prompts to the user. As a result, subsequent responses can be retrieved from the computing device and stored within the database. As a result, the analytics server can dynamically update the profile for the user until completion. A completed profile can occur in response to the analytics server preventing the webserver from displaying prompts to the user. However, in some instances, the profile can be incomplete after a time period. Incomplete profiles can occur when the user no longer interacts with the electronic application, no longer provides information to the electronic application, terminates the webpage, or saves the application for later. For example, if the user chooses to save the electronic application for later, the analytics server can display a GUI 1300 as depicted by FIG. 13.

Upon display of the GUI 1300, the analytics server can display graphical user interface elements 1302 and 1304 and display button 1306 and 1308 allowing the user to input their full name, email, and save the electronic application for a later time (e.g., one hour later, one day later, one week later, one month later, etc.), or return to finish the application at this time. The content of the GUI may also be inputted and/or revised by a system administrator and/or the webserver. In an example, the user can input their first name into graphical user interface element 1302 and their email into graphical user interface element 1304. From here, the user can press the button 1306 to save the application for a later time. In response to the user pressing the button 1306, the analytics server can start a timer to increment until reaching a threshold. The threshold can indicate a minimum amount of time before the user abandons the application. The timer can increment while the computing device does not detect any interactions by the user (e.g., accessing the electronic application, revising the electronic application, a login to the system, or other interaction that may qualify as indicating interest in the application, a product or service, or the entity hosting the webpage or webserver). Once the timer reaches the threshold (based on time elapsed in seconds, minutes, hours, days, weeks, etc.), the webserver or the computing device can generate an indication that indicates the user has abandoned the electronic application. Once generated, the webserver or the computing device can transmit the indication of abandonment of the electronic application to the analytics server.

The analytics server can receive the indication of abandonment representing a lack of interaction with the electronic application from the webserver. The analytics server can display a graphical user interface element within the electronic application to close the electronic application. In some instances, the webserver may not receive indications of interactions for a minimum amount of time (e.g., 5 minutes, 10 minutes, 15 minutes, 1 day, 5 days, 1 week, etc.). The analytics server can start a timer upon reception of the indication of the interaction and reset the time upon reception of a subsequent indication of an interaction. When the time starts or is reset, the analytics server can transmit the timer to the webserver to compare against the minimum amount of time for interactions. In response to the user selecting the graphical user interface element or the timer being greater than the minimum amount of time, the webserver can generate the indication of abandonment. Upon reception of the indication of abandonment, the analytic server can determine a time period to transmit a message to the computing device according to the information within the profile. The time period can represent a day, a week, a month, among other time periods for the analytic server to transmit the message. The analytics server can detect that the profile or the electronic application is incomplete and chose a time period according to the amount of information within the profile or the electronic application. For example, the user may have completed 90% of the electronic application, therefore the analytics server can determine to transmit the message after an indication that the user has not interacted with the application within a day of completing 90% of the electronic application. In another example, the profile may contain the name of the user and progress within the electronic application, therefore, the analytic server can determine to transmit the message after a week.

Figure 14:
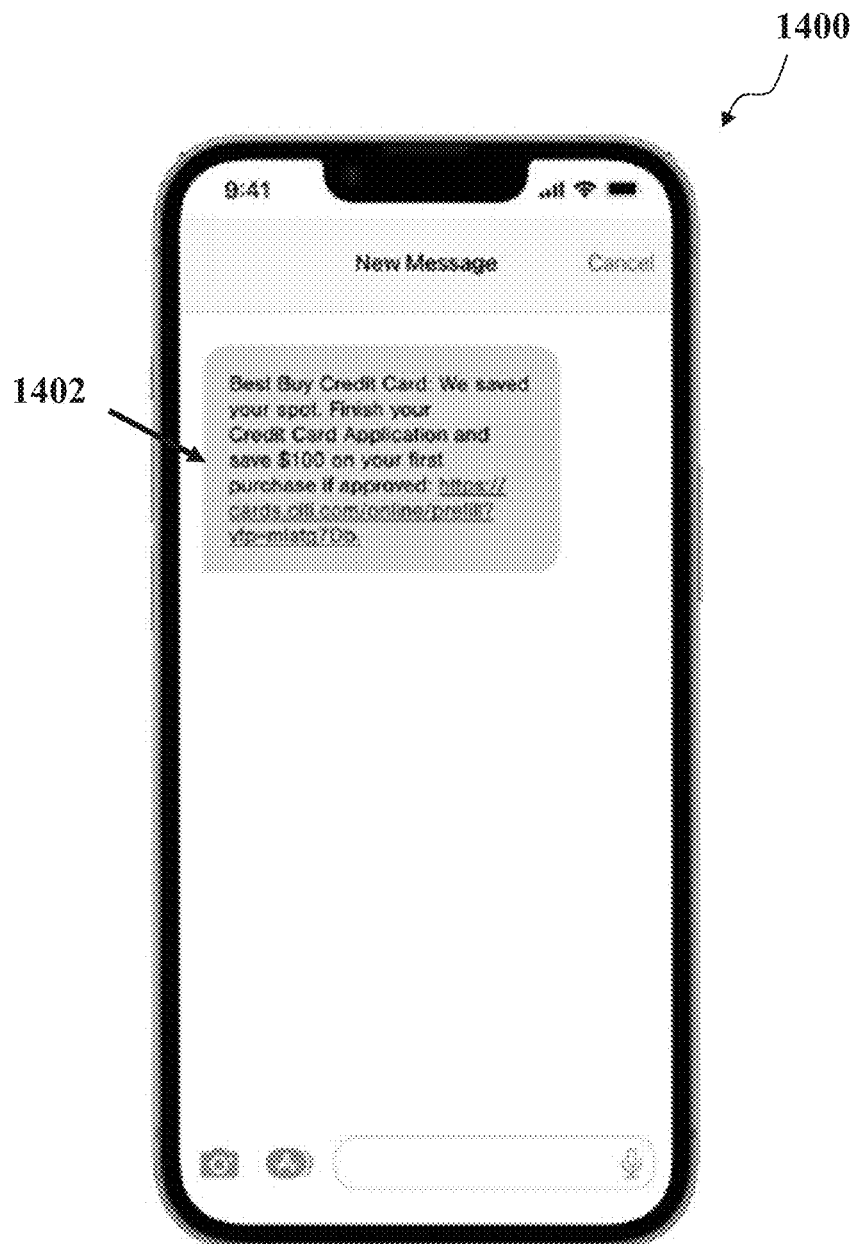
Figure 15:
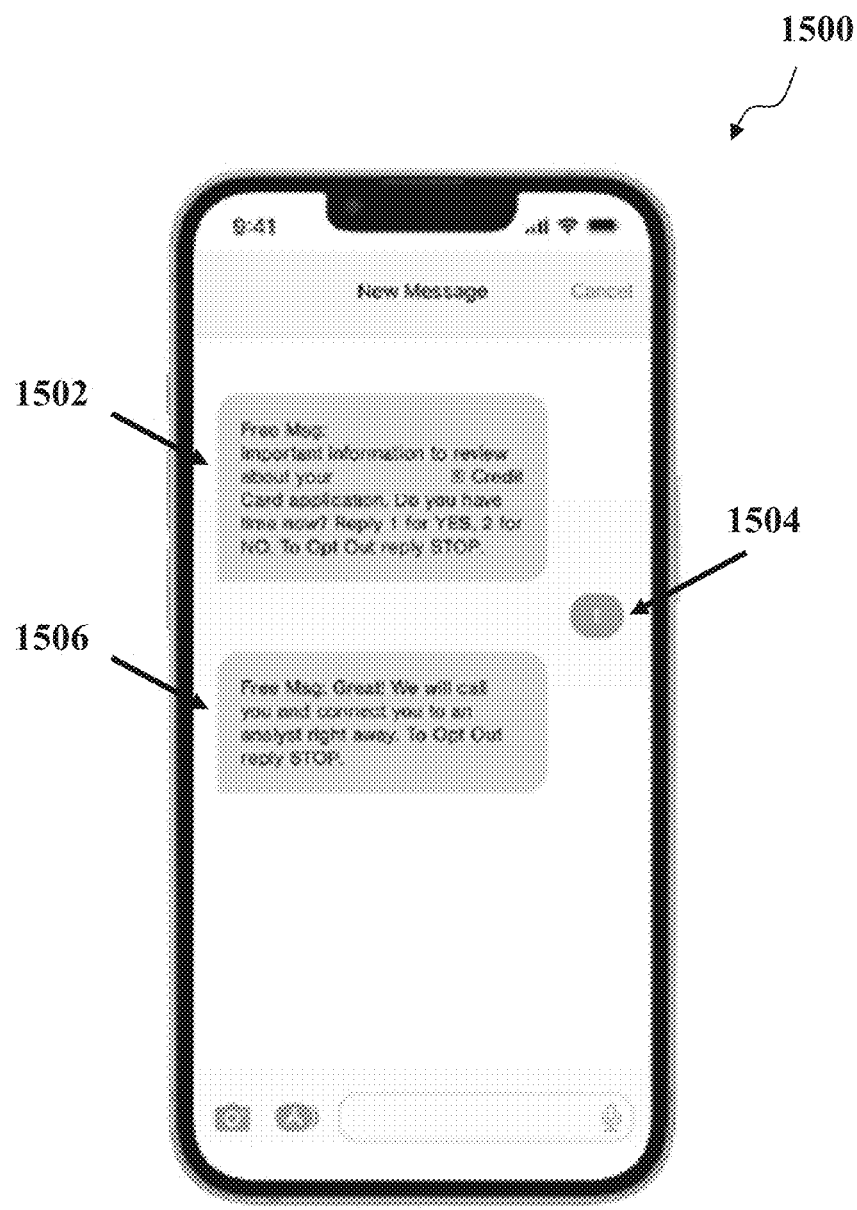

FIG. 14 depicts an example 1400 of the message 1402 transmitted to the computing device. The analytics server can include a hyperlink to the unfinished electronic application within the message 1402. In some instances, the analytics server can connect the user to a manager, analyst, or a support center (e.g., worker) to discuss the unfinished application as shown in the message 1506 in FIG. 15. FIG. 15 depicts an example 1500 of a message 1502 without the hyperlink. In this manner, the user can send a response 1504 to the analytics server to establish the connection between the user and the worker to complete the application.

When the user interacts with the hyperlink of message 1402 or responds to the message 1502, the analytics server can remove the indication of abandonment from the electronic application to resume progression of the electronic application. At step 1210, the analytics server can access the database to identify a temporary profile for the user that matches the generated profile. The analytics server can identify the temporary profile, prior to resuming progression of the electronic application. As a result, the analytics server can verify the user trying to access the electronic application as the electronic application can include user sensitive data (e.g., social security number, home address, credit score, annual income, etc.). The temporary profile can include basic information about the user such as, first name and last name, demographic data, and email, which is within the generated profile for the user. In this manner, the temporary profile can add a layer of security when authenticating a returning user. Once the analytic server identifies the temporary profile, the analytics server can match information within the temporary profile to the generated profile for the user. When the temporary profile and the generated profile do not match, the analytics server can access the database to identify a subsequent temporary profile for the user. The analytics server can iteratively repeat this process until a match between the temporary profile and the generated profile is found. For example, a first user can have the name "John Smith" and the email "johnsmith@gmail.com," whereas a second user can have the name "John Smith" and the email "jsmith1@gmail.com." From here, the analytics server can identify the temporary profile corresponding to John Smith with email johnsmith@gmail.com, however, the generated profile can correspond to John Smith with email jsmith1@gmail.com. Responsive to detecting that the temporary profile and the generated profile do not match, the analytics server can identify a subsequent temporary profile to match with the generated profile.

At step 1212, the analytics server can use the temporary profile to extract a communication identifier associated with the computing device. The communication identifier can correspond to an email communication, a phone communication, a social media communication, a device ID, a MAC address, an IP address, among others. For example, the temporary profile can include an email address associated with the user of the computing device. In another example, the temporary profile can include a phone number associated with the user of the computing device. Using the communication identifier, the analytic server can establish a communication with the respective computing device to transmit notifications and messages prior to verifying the user of the computing device.

At step 1214, the analytics server can use the communication identifier to transmit a notification to the computing device. The notification can be a text message, an email, a phone call, a direct message, a voice message, among other forms of notifications to authenticate a user. The notifications can include one or more authorization criteria for the user of the computing device. The authorization criteria can correspond to a one-time password (OTP), and randomized alpha numeric code, temporary password, randomized numeric codes, among other passwords to verify a computing device. For example, the analytic server can transmit an OTP to an email associated with the user associated computing device. In another example, the analytic server can transmit an OTP as a text message to a phone number associated with a user of the computing device.

Upon transmission of the notification, the analytic server can receive a response to the notification from the computing device. The analytics server can authenticate the response to the notification by matching the response with the one or more authentication criteria. In some instances, the analytic server can deny the response from the computing device based on a delta between the transmission of the notification and the reception of the response. When the delta is greater than a threshold, the analytic server can transmit a subsequent notification to the computing device.

In some instances, the response can include the incorrect authorization criteria. As a result, the analytic server can transmit the subsequent notification to the computing device. The subsequent notification can include authorization criteria that differ from the authorization criteria within the first notification to further improve security when accessing the electronic application. For example, the first notification can include "012345" as the OTP. The response from the computing device can include "012354." Since the analytic server received an incorrect response, the analytic server can transmit a subsequent notification to the computing device.

When the response satisfies the authorization criteria, the analytic server can load, for display on the computing device, a subsequent webpage hosted by the webserver, at step 1216. In this manner, the analytic server can provide the webpage to the computing device before the indication of abandonment was received. Once the webpage is displayed, the analytic server can identify the generated profile of the user according to the temporary profile. Prior to receiving the indication of abandonment, the analytic server can store each response to the plurality of prompts within the generated profile and the temporary profile. However, the analytics server can block the storage of the sensitive information (e.g., social security number, annual income, driver's license) of the user within the temporary profile. In this manner, less sensitive information (e.g., first name, last name, phone number, email) can be readily available to identify the respective user. Although examples are provided for sensitive and non-sensitive information, it is intended that the threshold for sensitive information may vary, and, for example, any personally-identifiable information (PII) may be considered sensitive information.

The analytic server can prevent the loss of any information before the user abandons the application. Furthermore, by performing the systems and methods described herein, the analytic server can securely maintain sensitive information stored within the profile and resume the progress of the electronic application after a verification, without the need to re-enter the sensitive information unlike conventional software solutions. Upon identification of the generated profile, the analytic server can prefill at least one prompt based on the generated profile or the plurality of responses to the plurality of prompts and remove the temporary profile to save computing resources, utilization, and storage within the system 200. Thereby, restoring the progress of the electronic application for the user.

Aspects of the systems and methods described herein can provide improved security while access private or secure information. The private information can correspond to loan details, credit history, credit score, credit inquiries, among other private information. When an individual does not lock their credit, the individual can be subject to credit fraud, identify theft, account takeover, card skimming, unauthorized purchases, phishing, mail theft, among other scenarios associated with credit fraud. To remedy these challenges, the system and methods described herein can use a web application to partially unlock or unfreeze the credit of an individual. A server can receive a request to access the credit associated with a user who is, for example, applying for a credit loan by executing a network operation. The network operation can link the server to a credit bureau (e.g., TransUnion) to transmit information associated with the user. If a lock is present on the credit associated with the user, the server can authenticate the user (e.g., biometric authentication) and generate a defined time window to unfreeze the account for the respective purpose to access the credit (e.g., applying for a credit loan). The defined time window can be one hour, one day, one week, one month, among other time windows. Upon generation of the defined time window, the server can cause the credit bureau to further authenticate the user and unlock the account for the defined time window or until the purpose of access the credit is satisfied.

In some instances, technical problems may arise during the operation of a chat-like input methods discussed herein that can potentially cause delays or interruptions in the intended flow. These issues can stem from various factors, such as connectivity errors, server response latency, incomplete data transmission, or synchronization mismatches between the server and the user's device and/or other servers involved in the process. Such problems, if left unresolved, could disrupt the user experience, forcing the user to restart or abandon the application process. This is particularly critical in applications dealing with sensitive data, such as electronic account management, where interruptions could lead to unnecessary abandonment. Therefore, identifying and addressing these technical problems promptly is needed to maintain a seamless and uninterrupted interaction flow.

To minimize user impact, it is crucial that these issues are resolved dynamically and in the background while the user continues to input data or interact on a frontend with the application. By implementing robust error detection and correction mechanisms, the analytics server can identify anomalies, such as missing data fields or delayed server responses, and take corrective actions without requiring user intervention. For example, the analytics server can retry failed network operations, resolve synchronization conflicts, or fetch missing data in parallel while the user progresses through the application. This ensures that the user's workflow remains smooth and uninterrupted, thereby preserving the application's usability and efficiency. By handling technical problems in this manner, the application fosters a reliable and user-friendly experience, where potential disruptions are effectively mitigated without the user being aware of any underlying issues.

One technical issue that may arise during the chat-like data input process discussed herein is the discovery that access to one or more electronic accounts is blocked. This can occur if the accounts are under a security freeze, have active restrictions, or if a request to access the accounts has been explicitly denied by the second server. Such a block can impede the analytic server's ability to retrieve necessary data or complete critical operations associated with the user's application. To address this issue seamlessly, the system must dynamically detect the blocked access and implement background measures to resolve it, such as initiating communication with the second server to modify or temporarily lift the block where authorized. During this process, the user can continue interacting with the application without disruption, as the system ensures that the underlying issue does not interfere with the flow. By handling blocked account access in real-time and behind the scenes, the system maintains the integrity of the application process while safeguarding the user's experience.

FIG. 16 illustrates a flowchart depicting operational steps to partially freeze an electronic account. The method 1600 describes how a server, such as the analytics server described in FIG. 2, displays various interactive graphical user interfaces configured to receive users' inputs. Even though the method 1600 is described as being executed by the analytics server, the method 1600 can be executed by any server and/or locally within a user's computing device or as a browser extension. Additionally or alternatively, the method 1600 can be executed by a webserver acting as both a webserver and the analytics server by hosting the website and generating the graphical user interfaces described herein. Furthermore, other configurations of the method 1600 may comprise additional or alternative steps or may omit one or more steps altogether.

As discussed herein, the method 1600 can be performed in a background manner, such that one or more of the processes discussed herein are not visible to the user and/or do not interrupt the data flow of the chat-like inputs discussed herein.

At step 1602, the analytics server can receive, via a graphical user interface displayed on a computing device, a first request to execute a network operation from a second server (e.g., webserver). Prior to receiving the first request, the analytics server can detect an interaction between the user and the graphical user interface of the computing device. The interaction can include a selection of a previously started electronic application, a login to the webserver hosted the electronic application, a selection of a credit loan (e.g., credit card, mortgage, car loan, product, etc.) among other interactions with the computing device or the graphical user interface element. Upon detection of the interaction, the analytics server can execute the network operation to request for the credit loan. The network operation can specify a respective credit bureau to communicate with regarding an electronic account associated with the user. The network operation can include information about the user, for example, the electronic application, the credit loan of the user, among other information to distinguish the user.

At step 1604, the analytics server can transmit to the webserver (e.g., credit bureau) a request for access to an electronic account associated with the electronic application of the user operating the computing device. In some instances, the analytics server can transmit the request for access to the electronic account in response to the execution of the network operation. Upon completion of the electronic application and execution of the network operation, the computing device can transmit a request indicating that the user submitted the electronic application. In some embodiments, the analytics server can execute the network operation prior to the completion of the electronic application. In this manner, the analytics server can execute the method 1600 in the background of the computing device to prevent interruption of the users flow while interacting with the electronic application. Concurrently to the transmission of the request, the analytic server can perform a validation on an electronic account associated with the user (e.g., credit inquiry). To validate the electronic account, the analytic server can communicate with the webserver (e.g., credit bureau) to access the electronic account associated with the user. For example, the analytic server can communicate with a credit bureau server (e.g., Experian) to perform a hard inquiry on the credit of the user. In another example, the analytic server can communicate with a different credit bureau server (e.g., TransUnion) to perform a hard inquiry on the credit of the user.

At step 1606, the analytics server can receive from the webserver an indication that a request to access and change at least one data record associated with the electronic account has been blocked by the second server. For example, the request to access and change at least one data record associated with the electronic account can indicate that the user has a freeze or a lock on the user's credit, whereby any requests to access, change, and/or otherwise utilize the at least one data record can be automatically denied by the status of being blocked. The change to the at least one data record can correspond to an adjustment of a user's credit score, an inquiry on the user's credit report, among other factors on the credit of the user.

In some embodiments, the block on the electronic account may refer to a security measure implemented by the second server to protect its data records from unauthorized access or manipulation. When a block is applied, the second server may enforce restrictions that prevent external requests-such as inquiries, updates, or changes to the user's account data—from being processed. In some embodiments, the block, as used herein, may refer to a denial of an application programming interface call received. The block may serve as a safeguard to maintain the confidentiality and integrity of sensitive information stored by or otherwise under control of the second server. In some embodiments, the second server may achieve the blocking by updating internal flags or indicators within its database to reflect the blocked status of the electronic account, thereby treating any incoming requests related to the account as invalid until the block is explicitly lifted or modified by an authorized entity.

The block on the electronic account can correspond to the user having a lock on, for example, their social security number, utilization, credit report, among other aspects relating to credit. Upon reception of the block, the analytics server can block access to the electronic account. To block access to the electronic account, the analytics server can retrieve a flag (an indicator of status in a data record) associated with a status of the electronic account. If the status of the flag (or other indicator) corresponds to being in a locked state (e.g., "frozen"), the analytics server can indicate that the webserver is blocking access to the electronic account. In some instances, the flag can have a plurality of attributes that indicate the type of transactions which are allowed via the electronic account. Upon reception of the flag, the analytics server can generate an error code such as "Account frozen", "Access Denied", "Unauthorized Access," among other error codes. As an alternative or in addition to the error code, the analytics server may transmit a response message automatically that the data record has been blocked from such a request being executed. Once the error code is generated, the analytics server can prevent the user from continuing the electronic application or progressing through or beyond the page hosted by the webserver (e.g., preventing access to a next page, disabling an interactive element (e.g., button) allowing transition to a following page, preventing input of further data into data fields, saving the application but not submitting a finalized application).

Figure 17:
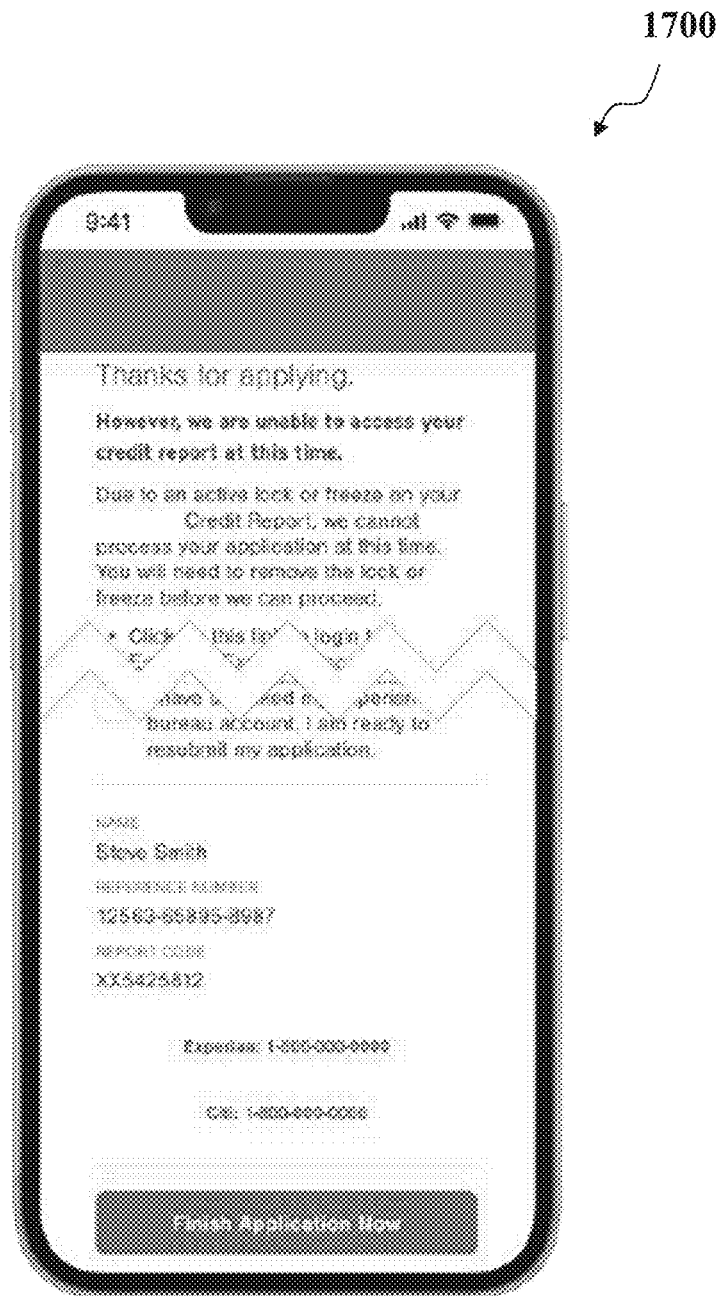
FIGS. 17-21 illustrate various graphical user interfaces displayed by the analytics server, in accordance with different embodiments.

Concurrently to blocking access on the electronic account, the analytics server can cause the user interface of the computing device to display one or more graphical user interface elements as shown in the GUI 1700 of FIG. 17, such that further transaction requests are blocked from further processing. The GUI 1700 can visually indicate that there is blocked access on the credit or electronic account of the user. The analytic server can generate the GUI 1700 for display on the computing device. By generating the GUI 1700, the analytics server can prevent access to the electronic application while the blocked access on is present on the electronic account.

Figure 18:
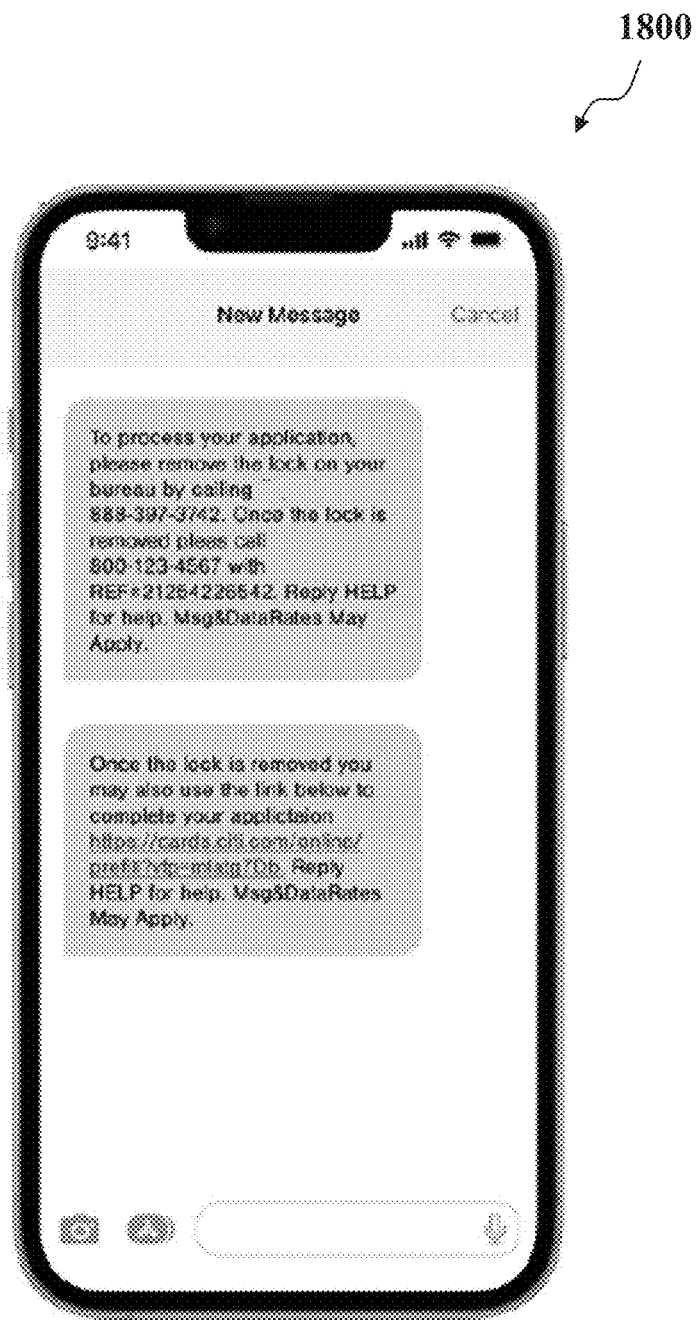

In some instances, the analytics server can transmit an electronic communication (e.g., email, text message, phone call, direct message) to the computing device as shown in example 1800 of FIG. 18. The electronic communication can indicate one or more alternative methods to remove the blocked access on from the account. For example, the electronic communication can indicate that the user can call a respective credit bureau to remove the blocked access on the account. However, removing the blocked access on the account does not allow for other external servers to access the electronic account of the user providing a secure means for using credit. The systems and methods described herein can partially remove the blocked access on the electronic account to allow a respective webserver to perform a credit inquiry on a user for a defined time window. In this manner, the user does not remove the lock on the credit bureaus while allowing access to the credit bureaus on demand. The block on the account can modified by a request from an authorized entity (e.g., a request message from a credit bureau server, the analytics server, and/or other server sending a message having an appropriate code in the instructions of the message authorizing such a change) to update the status. The updated status can indicate a removal of a block (e.g., removing a flag from the data record) or a partial removal of a block (e.g., an indicator in the data record that allows for limited functionality, but not as much as a full removal of the block).

At step 1608, the analytics server can revise the graphical user interface by presenting an input element configured to receive a second request to remove the blocked access. The input element can correspond to a message, an actionable object, a plurality of prompts, hyperlinks, among others. The input element can be displayed on the computing device for the user to interact with. For example, the GUI 1800 can display a message for a user to select a hyperlink. The hyperlink can trigger the computing device to proceed to the saved electronic application without accessing the electronic account. In some instances, the input element can be a notification transmitted to the computing device with a plurality of prompts for the user to populate with relevant information from within the electronic application. The plurality of prompts can include a user's name, address, salary, occupation, credit score, among other information about the user. In some instances, the analytics server can provide the webserver (e.g., credit bureau) with the information within a generated profile (e.g., social security number, annual income, birth certificate, mortgage, etc.) for the user to validate access to the electronic account (e.g., credit file) of the user. The analytics server can generate the temporary profile based on the information within the electronic application. As a result, the webserver can temporarily provide access to the electronic account to the analytics server upon approval by the user.

Upon reception of the input element on the computing device, the analytics server can receive a response from the computing device. The computing device can transmit the response to the analytics server. The response can include a button click (or other selection) of the hyperlink within the message, an opening of the message, a login to resume the electronic application, information provided within one or more prompts of the graphical user interface elements, among others. For example, the response to the graphical user interface element can include a button press on a hyperlink to resume the electronic application. The analytics server can generate the temporary profile based on the information within the electronic application using the login information within the response.

At step 1610, the analytics server can authorize the user operating the computing device via transmitting a token to the computing device. The analytics server can extract metadata and information from within the response to validate the user operating the computing device. To authorize the user, the analytics server can use one or more authorization criteria that can correspond to required information (e.g., social security number, annual income, birth certificate, mortgage, etc.) by the webserver (e.g., credit bureau) to remove the blocked access on the electronic account. By using the authorization criteria of the webserver, the system and methods described herein can secure a user's electronic account to prevent fraud (e.g., computing device was stolen) by requiring the information according to the webserver and not the criteria to unlock the computing device (e.g., passcode, fingerprint, pin). During authentication, the analytics server can retrieve the required information by the webserver and the obtain the information within the response. In some instances, the analytics server can obtain the information about the user from the temporary profile to supplement any placeholders within the response. For example, the response can include the name, the address and social security number, of the user, however, the analytics server can use the temporary profile to provide the salary, age, among other information if needed.

Figure 19:
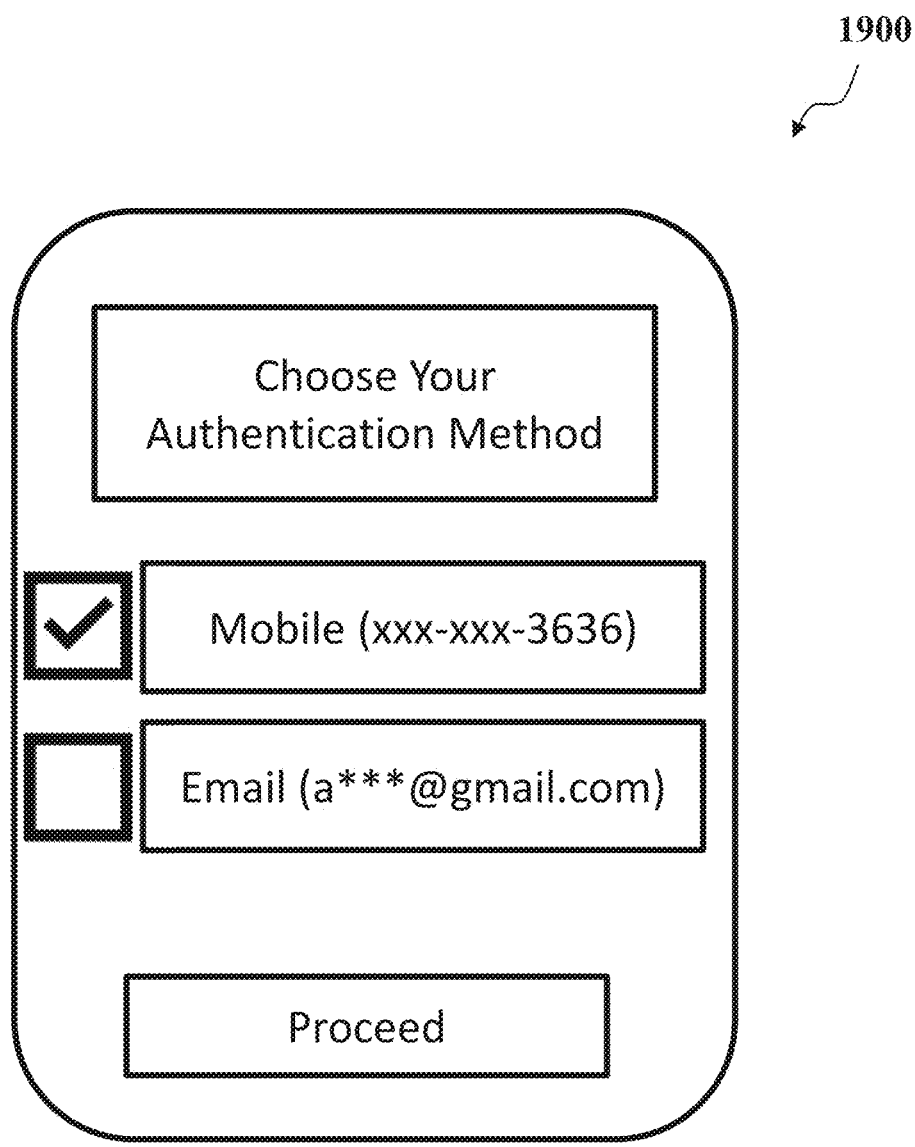

The analytics server can use a communication identifier (e.g., phone number, c-mail address, etc.) to transmit a token to the computing device. The analytics server can generate and display GUI 1900, as shown in FIG. 19, to determine the token for the computing device. The token can be a text message, an email, a phone call, a direct message, a voice message, among other forms of notifications to further authenticate a user. The token can include one or more authorization criteria for the user of the computing device. The authorization criteria can correspond to an OTP, a randomized alphanumeric code, a temporary password, randomized numeric codes, among other passwords to verify a computing device. For example, the analytic server can transmit an OTP to an email associated with the user operating computing device. In another example, the analytic server can transmit an OTP as a text message to a phone number associated with a user operating the computing device.

Upon transmission of the token, the analytic server can receive a response to the token from the computing device. In some instances, the analytic server can deny the response from the computing device based on a delta (e.g., time) between the transmission of the notification and the reception of the response. When the delta is greater than a threshold, the analytic server can transmit a subsequent token to the computing device. In some instances, the response can include the incorrect authorization criteria. As a result, the analytic server can transmit the subsequent token to the computing device. The subsequent token can include authorization criteria that differ from the authorization criteria within the first token to further improve security when accessing the electronic application. For example, the first token can include "012345" as the OTP. The response from the computing device can include "012354." Since the analytic server received an incorrect response, the analytic server can transmit a subsequent token to the computing device. When the response satisfies the authorization criteria, the analytics server can further authenticate the user of the computing device.

Figure 20:
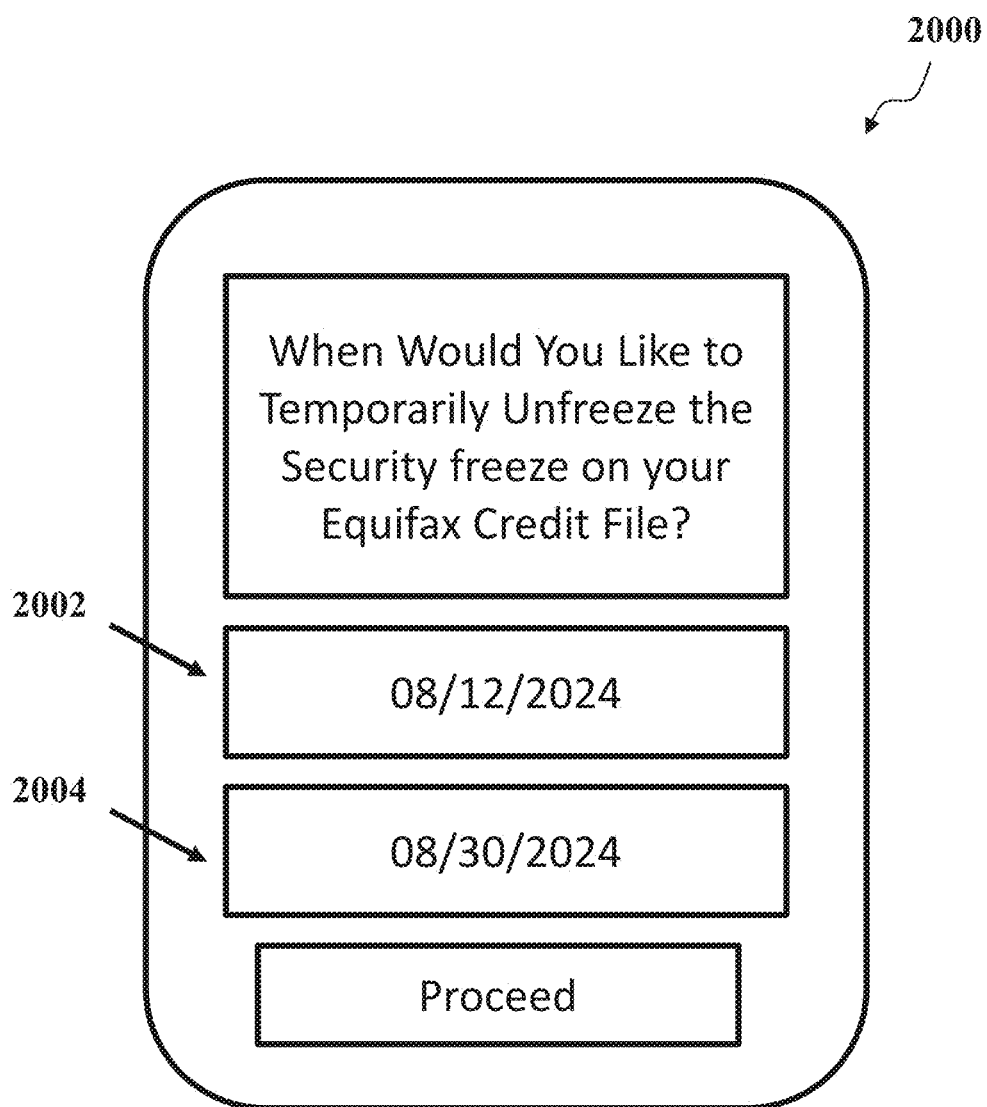

At step 1612, the analytics server can generate a defined time to remove the blocked access on the electronic account. The analytics server can generate the defined time to remove the blocked access based on the response satisfying the one or more authorization criteria. To generate the defined time, the analytics server can provide the webserver (e.g., credit bureau) with the information within the generated profile (e.g., social security number, annual income, birth certificate, mortgage, etc.) to validate access to the electronic account (e.g., credit file) of the user. As a result, the webserver can temporarily provide access to the electronic account to the analytics service upon approval by the user. To receive the temporary access and remove the blocked access on the electronic account, the analytics server can generate GUI 2000 as shown in FIG. 20. GUI 2000 can include graphical user interface elements 2002 and 2004 to define a time period for the analytic server to have temporary access to the electronic account. In some instances, the webserver can define the time to temporarily remove the blocked access on the electronic account. In some instances, the user can select the defined time to remove the blocked access on the electronic account. Once the time to remove the blocked access on the account is defined, the analytics server can generate a subsequent request for the web server. The subsequent request can include the response that satisfies the one or more authorization criteria, the defined time to remove the blocked access on the electronic account, and the corresponding electronic application. When the blocked access is removed from the electronic account, the analytic server can modify the flag associated with the electronic account to indicate the removal of the blocked access and generate instructions for the webserver to remove the blocked access on the electronic account.

At step 1614, the analytics server can cause the webserver to remove the block access on the electronic account. Before the web server removes the blocked access on the electronic account, the analytics server can provide instructions to determine whether the generated defined time is malicious based utilizing one or more factors to verify the user. The instructions can cause the webserver can execute another verification of the user by using the responses to the authorization criteria, the information within the electronic application, the geographical location of the user, the history of defied time for a user, among other factors associated with the user to ensure secure access to the electronic account. Once the webserver further verifies the user, the webserver can remove the blocked access on the electronic account. To remove the blocked access on the electronic account, the instructions can cause the webserver to update database housing a plurality of electronic accounts b specifying the respective electronic account of the user according to the information within the electronic application, the geographical location of the user, the history of defied time for a user, among other factors associated with the user. The instructions can update the database to adjust or modify the setting associated with electronic account to indicate that the electronic account is no longer blocked from access. Upon completion of the instructions, the webserver can and transmit an indication of removal of the blocked access to the analytics server.

The analytics server can trigger or cause the webserver to remove the blocked access on the electronic account in response to a context based trigger. The context based triggers can correspond to a request for subsequent blocked access, specific merchant class (e.g., retail, E-commerce, automotive, healthcare), dollar amount, among other triggers. For example, the analytics server can execute the network operation for a loan up to an indicated amount (e.g., $1500, $3000, $5000). Responsive to the network operation being executed for a dollar amount under the indicated loan amount, the analytics server can transmit a request to access the electronic account to the webserver. The request can indicate that the value is under the indicated loan amount and cause the webserver to provide access to the electronic account. In another example, the analytics server can execute the network operation for a merchant class (e.g., automotive). Responsive to the network operation being executed for the automotive merchant class, the analytics server can transmit a request to access the electronic account to the webserver. The request can indicate the merchant class and cause the webserver to provide access to the electronic account.

Figure 21:
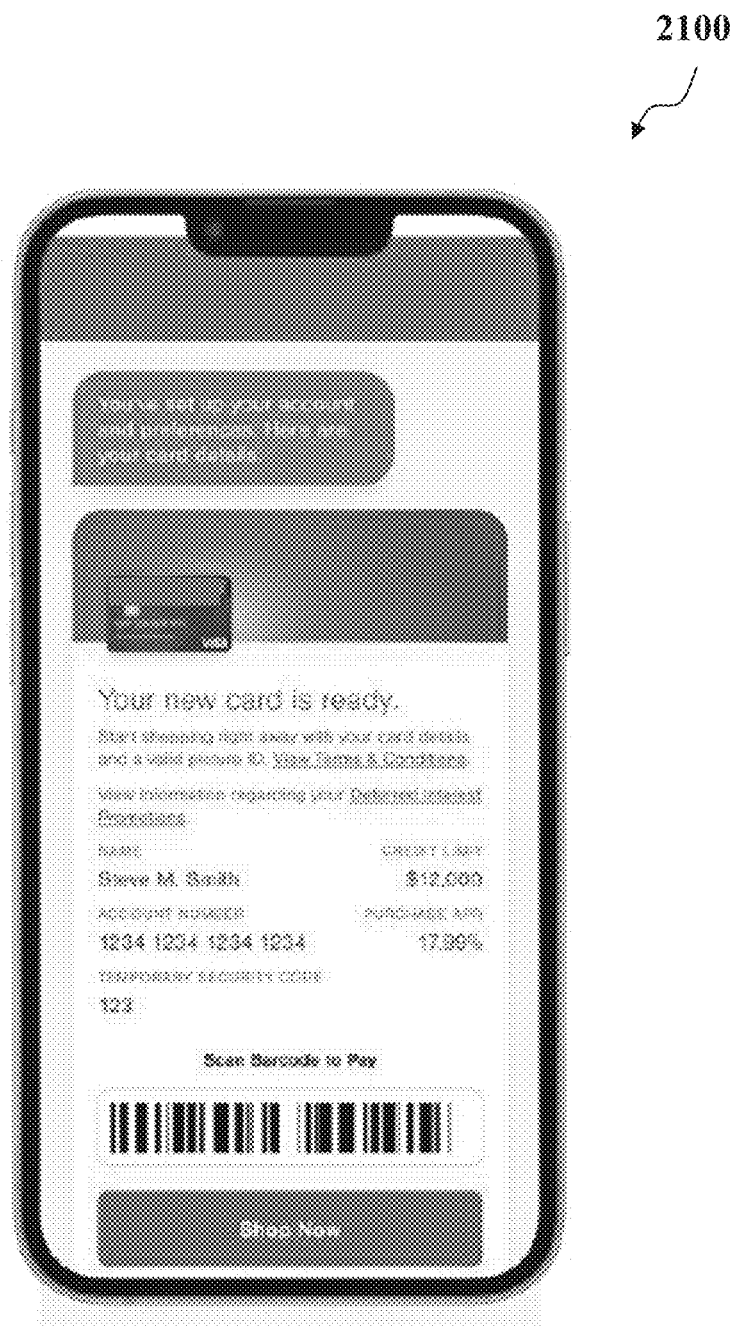

Upon reception of the indication of the removal of the blocked access, the analytics server can provide access to the electronic account for the defined time. The analytics server can generate and display GUI 2100, as shown in FIG. 21, at the computing device to display the complete electronic application. Conventional software solutions cannot allow the user to provide temporary access to credit information for a specific purpose. Rather, the user must contact the credit bureau to define the time period and provide access to all webservers and merchants connected via the network. However, using the systems and methods described herein, the user can provide access only to the respective analytics server managing the electronic application associated with the user.

In step 1614, the analytics server may cause the second server to block future access to the electronic account when a third request is received from the electronic device after the defined time.

In some embodiments, in response to an expiration of the defined time, the analytics server can transmit a request to block access on the electronic account to the webserver. In some instances, the analytic server can transmit the request to block access on the electronic account upon completion of the electronic application. The request to block access can include computer readable instructions to cause the webserver to reapply the lock to the electronic account associated with the user. The expiration of the deletion time can occur after the date and time specified in the defined time. For example, the defined time can be seven days. After the seventh day, the analytics server can transmit the request to block access on the electronic account. Concurrently to the expiration of the defined time or the response to the request to block access on the electronic account, the analytics server can block access to the electronic account. By blocking access to the electronic account, the analytics server can revoke the temporary access given to the user. In another example, the defined time can be one month. After the one month, the analytics server can block access to the electronic account, thereby securing the electronic account of the user to prevent third party webservers access.

In some embodiments, the server can cause the second server to block future access to the electronic account upon receiving a third request from an electronic device after the expiration of a defined time. Specifically, when the server detects that the third request falls outside the predefined time window previously authorized for access to the electronic account, it can generate and transmit instructions to the second server to reinstate the block on the electronic account. In some embodiments, the block may be instated for all requests to access the account. However, alternatively, the block may be specific to certain electronic devices and/or certain requests. For instance, the block may only be specific to new loans or loans that are more than a certain amount. In another example, the block may be specific to certain electronic devices (e.g., only requests received from the user's cell phone).

The block can be applied to restrict further interactions with the electronic account, thereby ensuring the account remains protected against unauthorized or unintended access beyond the approved time period.

In some embodiments, the analytics server may validate the timing of the third request by comparing the timestamp associated with the third request to the expiration of the defined time window. If the timestamp indicates that the request is outside the defined time, the server can generate a status update for the second server indicating that access to the electronic account should be blocked. In some instances, the status update can modify one or more flags or indicators within the second server's database to reflect the reinstated block. For example, the server may instruct the second server to update a "blocked" attribute in the user's account record, effectively preventing any future operations involving the electronic account until the block is manually lifted or a new authorization process is initiated.

Concurrently with the transmission of the block instructions, the analytics server can update the graphical user interface on the electronic device to notify the user of the reinstated block. For instance, the user may receive a message indicating that the time window for access has expired and that future requests will be denied unless a new authorization process is completed. The notification can include actionable elements, such as links or prompts, to guide the user through reinitiating the authorization process, if desired.

In some embodiments, the server may generate an audit log of the third request and the subsequent blocked actions/requests compliance and security purposes. The audit log can include information such as the timestamp of the third request, the user's account identifier, and details of the block instructions transmitted to the second server. This log can be stored in a secure database and accessed for review in case of disputes or for regulatory compliance.

Figure 22:
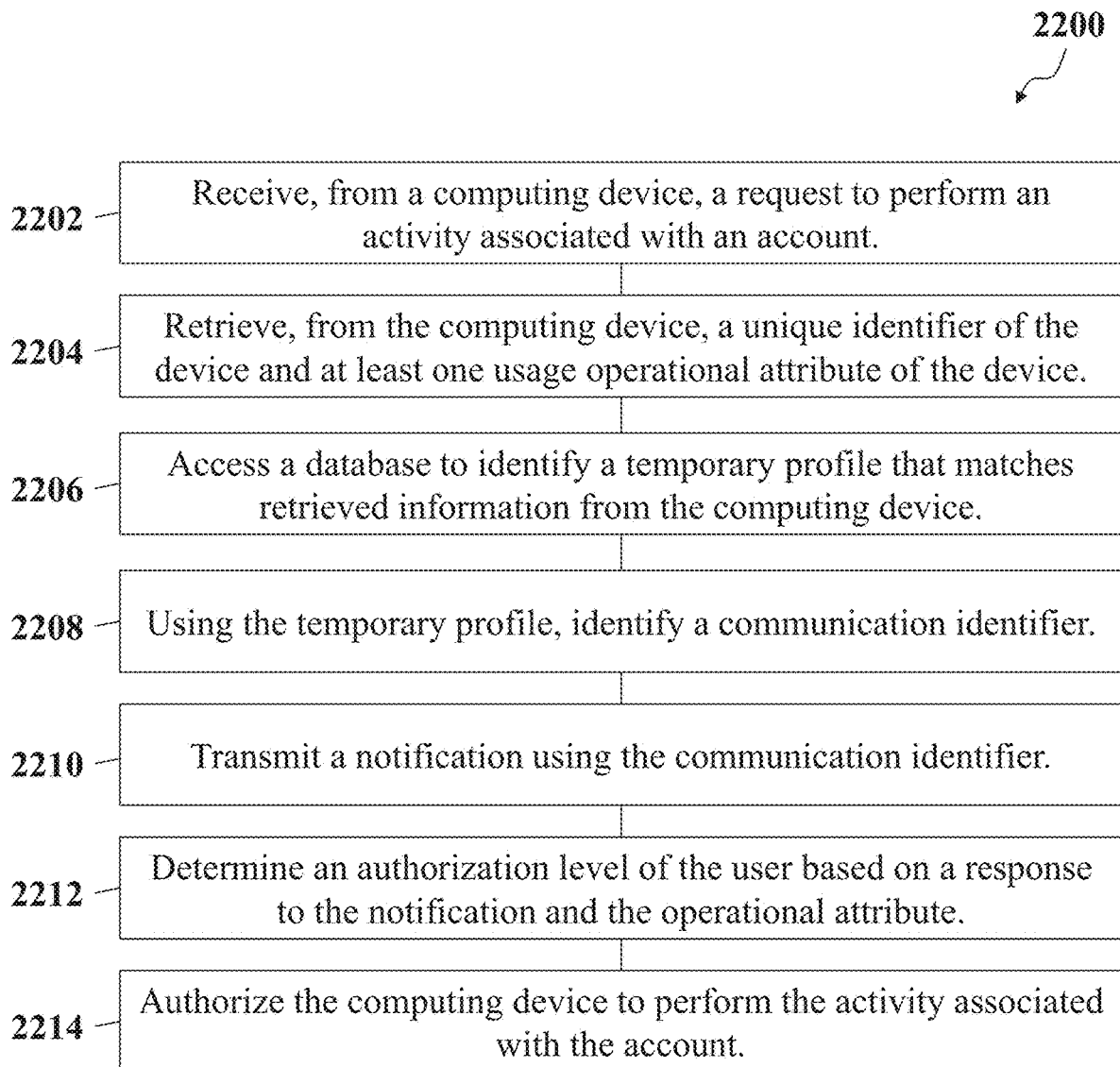
FIG. 22 illustrates a flowchart depicting operational steps to authenticate a user, in accordance with different embodiments.

FIG. 22 illustrates a flowchart depicting operational steps for a chat-like data input method/system, in accordance with an embodiment. The method 2200 describes how a server, such as the analytics server described in FIG. 22, displays various interactive graphical user interfaces configured to receive users' inputs. Even though the method 2200 is described as being executed by the analytics server, the method 2200 can be executed by any server and/or locally within a user's computing device or as a browser extension. Additionally or alternatively, the method 2200 can be executed by a webserver acting as both a webserver and the analytics server by hosting the website and generating the graphical user interfaces described herein. Furthermore, other configurations of the method 2200 may comprise additional or alternative steps, or may omit one or more steps altogether.

At step 2202, the analytic server can receive from a computing device a request to perform an activity associated with an account. The account can be at electronic account associated with a credit card from a merchant, a credit card from a bank, an application associated with a bank, among other electronic accounts. The activity can be payments (e.g., one-time payment, payment assistance, autopay, third party payments, etc.), viewing a summary/overview of the account, disputes (e.g., status of a dispute, open a dispute), sign up for biometrics, quick response (QR) code generation, reward redemption, profile updates, among other activities associated with an electronic account. When the user initially attempts to access the account on the computing device, the user can indicate the activity in which they would like to perform.

Figure 23:
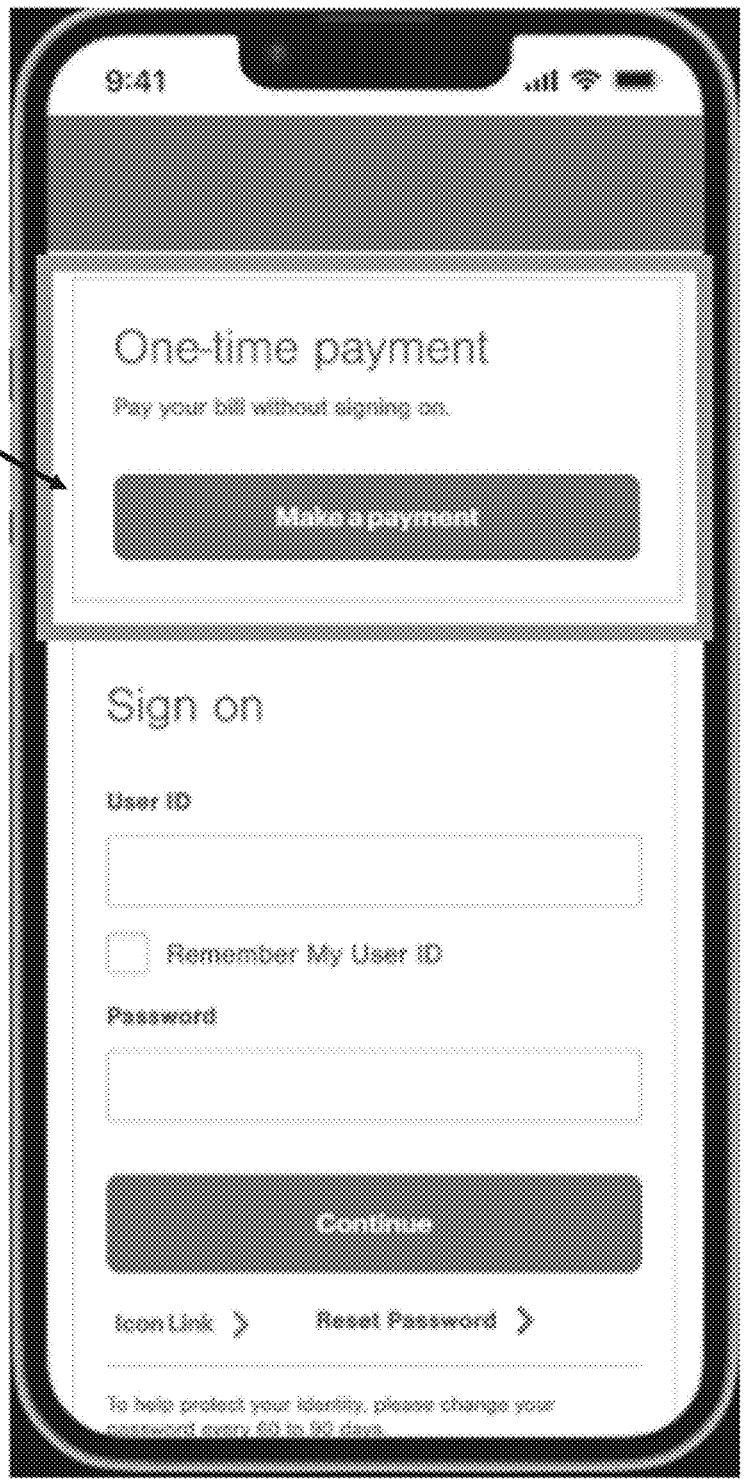

FIG. 23 depicts an example GUI 2300 displayed on the computing device. The GUI 2300 can include a graphical user interface element 2302 to make an online payment without signing into the electronic account. Using FIG. 23 as an example, the user can request to make a payment on the account by interacting with the graphical user interface element 232102 on the computing device. From here, the computing device can transmit the request to make a payment to the analytics server. As a result, the analytic server can receive the request to make a payment from the computing device.

Upon receiving the request, the analytics server can determine whether the user prefers to authenticate themselves without signing in. Conventional software solutions require the user to sign into the account with a username and password, prior to performing the activities described above. However, repeating such a process on several occasions throughout a period of time (e.g., within an hour, within a day, within a week) can waste significant computing resources at the computing device, by unnecessarily generating, rendering, and displaying all available activities within an application. Furthermore, it is not efficient to provide access to all activities when the user to sign on multiple times within an hour to complete one activity (e.g., make a payment at a first time, view credit report at a second time, add a payment source at a third time). Using the systems and methods described herein, the analytics server can provide the user access to a selected activity prior to the user signing into the account. Therefore, the computing device can provide access to the selected activity to perform within the account.

At step 2204, the analytic server can retrieve, from the computing device, a unique identifier of the device and at least one operational attribute of the computing device. The unique identifier of the device can correspond to a MAC address, a Serial Number, a Device Identifier, a Unique Device Identifier, an IP address, among other forms of identifiers. For example, the analytics server can retrieve the serial number associated with the computing device. Using the webserver, the analytics server can identify that the computing device is a tablet. In another example, the analytics server can retrieve the MAC address associated with the computing device. The at least one operational attribute can correspond to the selected activities by the user. By retrieving the at least one operational attribute, the analytics server can determine a level of access for each activity in the selected activities. In this manner, the analytics server can preconfigure the application in accordance with the level of access prior to authenticating the user of the computing device. Furthermore, the analytic server can proactively limit the amount of activities for display within the application.

Figure 24:
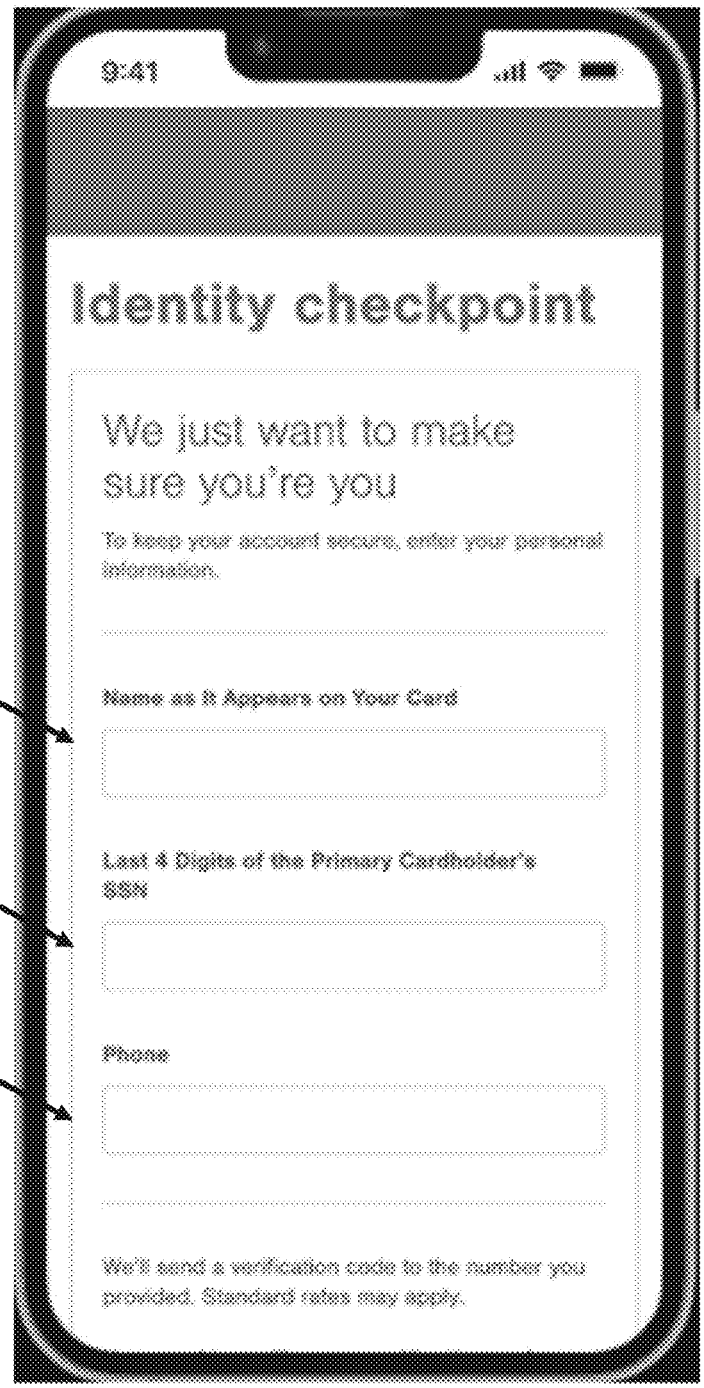

At step 2206, the analytics server can access the database to identify a temporary profile for the user. To identify the temporary profile, the analytics server can generate and display GUI 2400 as shown in FIG. 24 on the computing device. The GUI 2400 can include one or more graphical user interface elements 2402, 2404, and 2406 for the user to input a response to the graphical user interface elements. Once displayed, the user can respond to the prompts within the graphical user interface elements of the GUI 2400 to transmit the information to the analytics server. Upon retrieval of the information, the analytics server can extract the information within the responses and use the responses to identify the temporary profile within the database.

The analytics server can identify the temporary profile, prior to allowing the user to perform the activity associated with the account. As a result, the analytics server can verify the user trying to access the electronic application as the electronic application can include user sensitive data (e.g., social security number, home address, credit score, annual income, etc.). The temporary profile can include information about the user such as, first name and last name, name on a credit card, phone number, social security number, and an email, according to the information retrieved from the responses. In this manner, the temporary profile can add a layer of security when authenticating a user. Once the analytic server identifies the temporary profile, the analytics server can match information within the temporary profile to information retrieved from the responses. When the temporary profile and information do not match, the analytics server can access the database to identify a subsequent temporary profile for the user. The analytics server can iteratively repeat this process until a match between the temporary profile and the generated profile is found. For example, a first user can have the name "John Smith" and the email "johnsmith@gmail.com," whereas a second user can have the name "John Smith" and the email "jsmith1@gmail.com." From here, the analytics server can identify the temporary profile corresponding to John Smith with email johnsmith@gmail.com, however, the generated profile can correspond to John Smith with email jsmith1@gmail.com. Responsive to detecting that the temporary profile and the information do not match, the analytics server can identify a subsequent temporary profile to match with the generated profile.

At step 2208, the analytics server can use the temporary profile to identify a communication identifier associated with the computing device. The communication identifier can correspond to an email communication, a phone communication, a social media communication, a device ID, a MAC address, an IP address, among others. For example, the temporary profile can include an email address associated with the user of the computing device. In another example, the temporary profile can include a phone number associated with the user of the computing device. Using the communication identifier, the analytic server can establish a communication with the respective computing device to transmit notifications and messages prior to verifying the user of the computing device.

At step 2210, the analytics server can use the communication identifier to transmit a notification to the computing device. The notification can be a text message, an email, a phone call, a direct message, a voice message, among other forms of notifications to authenticate a user. The notifications can include one or more authorization criteria for the user of the computing device. The authorization criteria can correspond to an OTP, and randomized alpha numeric code, temporary password, randomized numeric codes, among other passwords to verify a computing device. For example, the analytic server can transmit an OTP to an email associated with the user associated computing device. In another example, the analytic server can transmit an OTP as a text message to a phone number associated with a user of the computing device.

Figure 25:
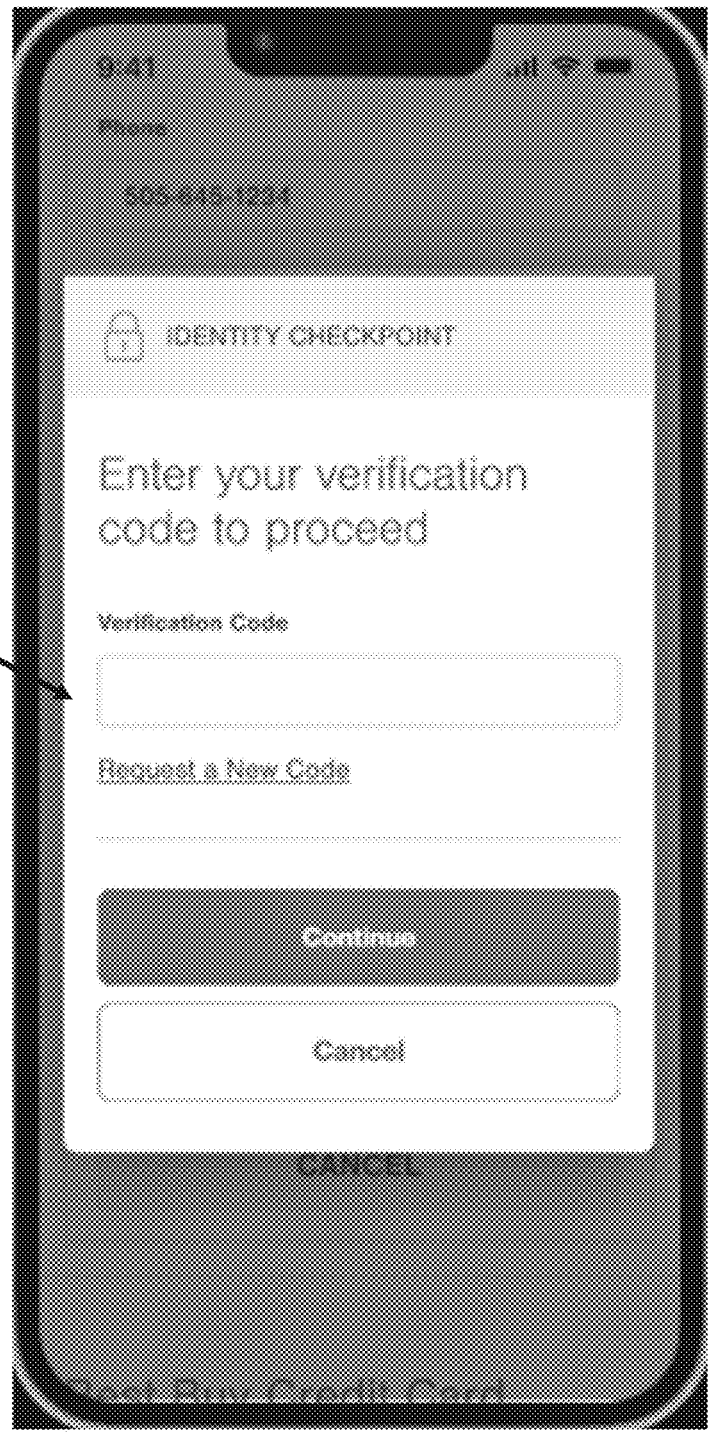

Upon transmission of the notification, the analytic server can receive a response to the notification from the computing device within the GUI 2500 as shown in FIG. 25. The GUI 2500 can include a graphical user interface element 2502 for the response to the notification. The analytics server can authenticate the response to the notification by matching the response with the one or more authentication criteria. In some instances, the analytic server can deny the response from the computing device based on a delta between the transmission of the notification and the reception of the response. When the delta is greater than a threshold, the analytic server can transmit a subsequent notification to the computing device. In some instances, the response can include the incorrect authorization criteria. As a result, the analytic server can transmit the subsequent notification to the computing device. The subsequent notification can include authorization criteria that differ from the authorization criteria within the first notification to further improve security when accessing the electronic application. For example, the first notification can include "012345" as the OTP. The response from the computing device can include "012354." Since the analytic server received an incorrect response, the analytic server can transmit a subsequent notification to the computing device.

At step 2212, the analytics server can determine an authorization level of the user. The authorization level can be determined based on the response to the notification and the operational attribute of the computing device. The authorization level can coincide with the level of access described above. As the authorization level increases, the level of access to the activities within the application can increase. In this manner, users related to the primary cardholder can access the account to perform activities. For example, a child of the primary cardholder can have an authorization level to make payments to third parties (e.g., Zelle, Amazon, PayPal). In another example a spouse of the primary cardholder can have an authorization level to enter a new payment source. In yet another example, the primary cardholder can access everything associate with the account.

Considering the operational attribute of the computing device, the authorization level can change regardless of the user. For example, the user can choose to make a payment without signing into the account. Therefore, the analytic server can determine an authorization level such that the user can make a payment to the account. In some instances, the analytics server can determine whether the determined authorization level includes the selected activity by the user. Each activity can include an authorization level that is extracted when determining the authorization level for the user. For example, if the user selects to apply for a replacement card, the analytic server can extract the authorization level to apply for the replacement card. In another example, if the user selects to make a payment, the analytics server can extract the authorization level to make the payment. However, it is to be noted that the primary cardholder/account holder can access all activities within the account.

Figure 26:
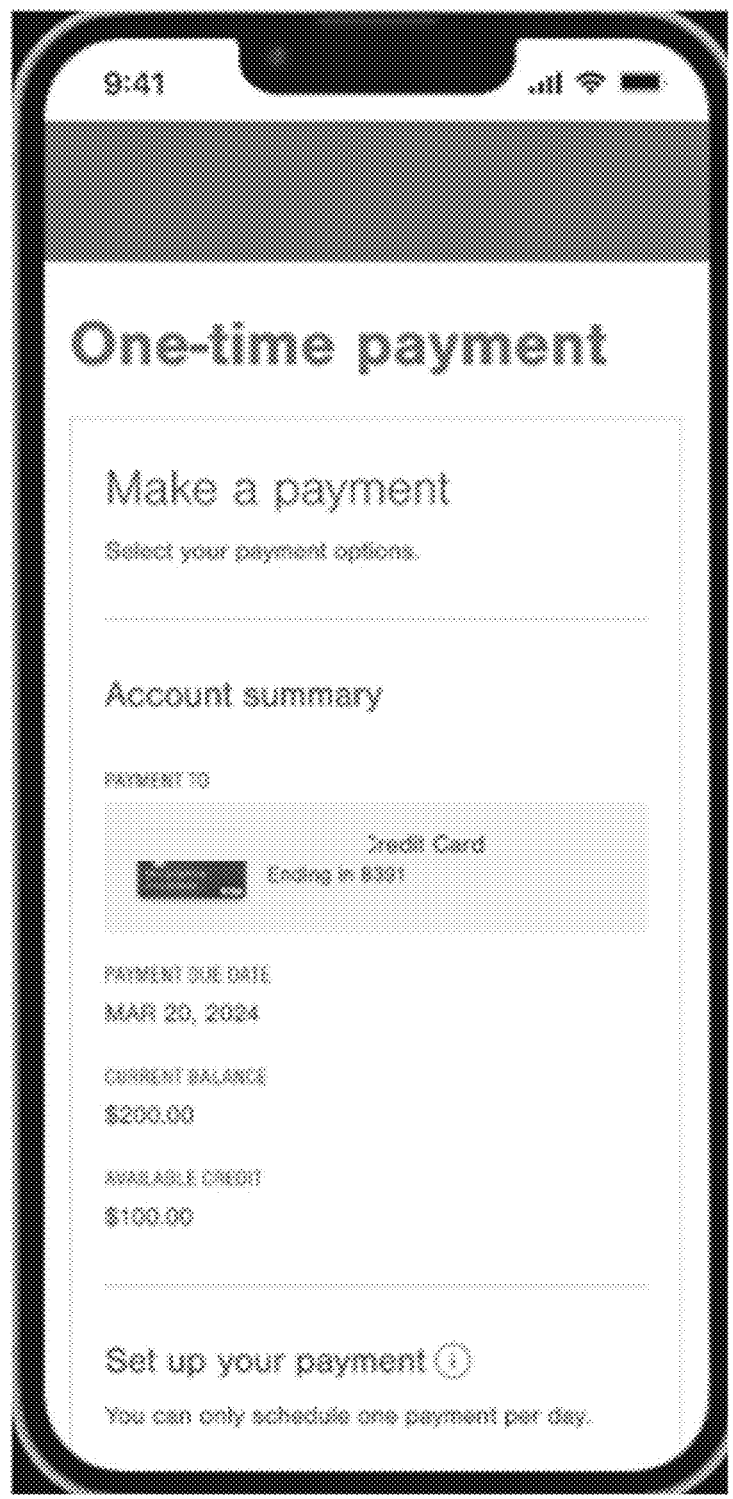
Figure 27:
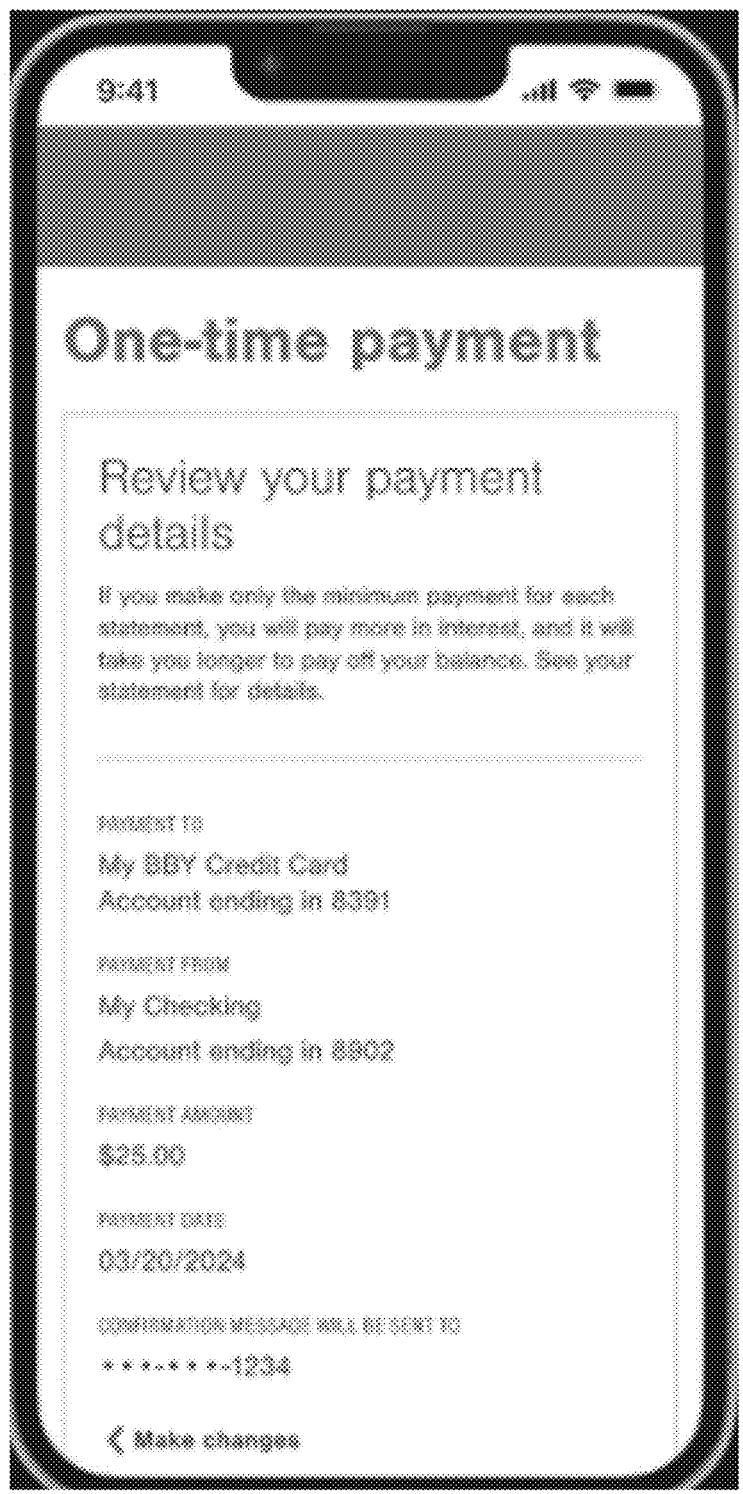
Figure 28:
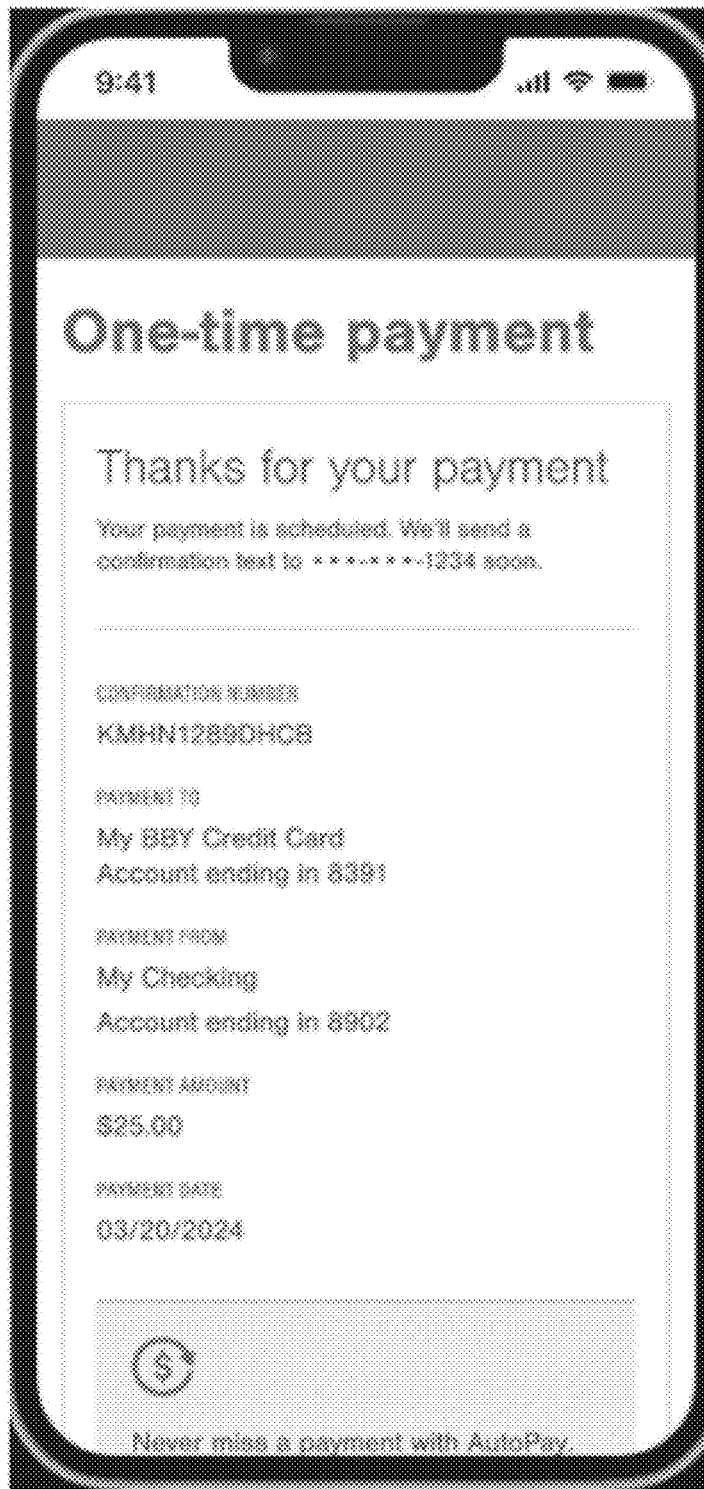
Figure 29:

At step 2214, the analytics server can authorize the computing device to perform the activity in response to the activity being included within the authorization level as shown in FIGS. 26-28. Once the computing device receives authorization, the analytics server can generate a GUI 2900 as shown in FIG. 29 to provide alternative sign on options (e.g., account authentication, biometric authentication) without the use of a username and password. The user can interact with the GUI 2900 to obtain the alternative sign on options. In this manner, the alternative sign on options can provide more efficient ways to establish authorization levels. For example, the primary cardholder can register a face identifier to the account. Therefore, once the face of the primary cardholder is detected, the analytics server can provide access to all activities within the account. In a similar manner, the primary cardholder can register a face identifier of a child to allow the child to have access to purchases under a threshold dollar amount. Therefore, once the face of the child is detected, the analytics server can provide access to purchases under the threshold dollar amount. In some instances, the analytics server can generate a QR code for each user of the account as shown in GUI 3000 of FIG. 30. The QR code can correspond to the authorization level of the user, thereby allowing the users to perform activities within a respective authorization level. In some instances, according to authorization level, the user can access various levels of the electronic account. For example, a first authorization level can upload documents, download documents, make automatic payments, view an account summary, redeem rewards, access alternative payment forms, among other aspects of the graphical user interface.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    receiving, by a server from a computing device operated by a user, a request to execute an activity associated with the user;
    retrieving, by the server from the computing device, a unique identifier of the computing device and at least one operational attribute of the computing device;
    accessing, by the server, a database to identify temporary profile that matches the unique identifier retrieved from the computing device and the at least one operational attribute of the computing device;
    using the temporary profile and the unique identifier, identifying, by the server, a communication identifier;
    transmitting, by the server, a notification using the communication identifier, the notification including one or more authentication criteria;
    determining, by the server, an authorization level of the user based on a response to the notification and the at least one operational attribute; and
    in response to the requested activity being included within the authorization level, authorizing, by the server, the computing device to execute the activity.

2. The method of claim 1, further comprises receiving, by the server from the computing device, a selection of the activity.

3. The method of claim 1, further comprising:
generating, by the server, a graphical user interface element for display by the computing device; and
displaying, by the server, the graphical user interface element on the computing device.

4. The method of claim 3, further comprises receiving, by the server from the computing device, an indication of an interaction between the user and the graphical user interface element on the computing device.

5. The method of claim 1, wherein the activity is at least one of a payment, a dispute, or a summary.

6. The method of claim 1, further comprising:
authenticating, by the server, a response to the notification by matching the response with the one or more authentication criteria; and
determining, by the server, that the response satisfies each of the one or more authentication criteria.

7. The method of claim 1, further comprises providing, by the server, access to the activity according to the authorization level.

8. The method of claim 1, further comprises registering, by the server, biometric authorization in response to authorization of the computing device to perform the activity.

9. The method of claim 8, further comprises assigning, by the server, an authorization level to each user according to the biometric authorization.

10. The method of claim 1, further comprises presenting, on a page hosted by a second server, a first graphical element embedded within the page, the first graphical element comprising a first conversation bubble shape and a text string corresponding to a first prompt of a set of prompts of an electronic form, the first graphical element having a first visual attribute that matches at least one visual attribute of the page containing the first conversation bubble and displayed on a computing device.

11. A computer system comprising:
a server comprising one or more processors to:
receive, from a computing device operated by a user, a request to perform an activity;
retrieve from the computing device, a unique identifier of the computing device and at least one operational attribute of the computing device;
access a database to identify temporary profile that matches the unique identifier retrieved from the computing device and the at least one operational attribute of the computing device;
using the temporary profile and the unique identifier, identify a communication identifier;
transmit a notification using the communication identifier, the notification including one or more authentication criteria;
determine an authorization level of the user based on a response to the notification and the at least one operational attribute; and
in response to the requested activity being included within the authorization level, authorize the computing device to perform the activity.

12. The system of claim 11, the one or more processors to receive, from the computing device, a selection of the activity.

13. The system of claim 11, the one or more processors to:
generate a graphical user interface element for display by the computing device; and
display the graphical user interface element on the computing device.

14. The system of claim 13, the one or more processors to receive, from the computing device, an indication of an interaction between the user and the graphical user interface element on the computing device.

15. The system of claim 11, wherein the activity is at least one of a payment, a dispute, or a summary.

16. The system of claim 11, the one or more processors to:
authenticate a response to the notification by matching the response with the one or more authentication criteria; and
determine that the response satisfies each of the one or more authentication criteria.

17. The system of claim 11, the one or more processors to provide access to the activity according to the authorization level.

18. The system of claim 11, the one or more processors to register biometric authorization in response to authorization of the computing device to perform the activity.

19. The system of claim 18, the one or more processors to assign an authorization level to each user according to the biometric authorization.

20. The system of claim 11, the one or more processors to present, on a page hosted by a second server, a first graphical element embedded within the page, the first graphical element comprising a first conversation bubble shape and a text string corresponding to a first prompt of a set of prompts of an electronic form, the first graphical element having a first visual attribute that matches at least one visual attribute of the page containing the first conversation bubble and displayed on a computing device.

* * * * *